US011892334B2

(12) United States Patent
Eden et al.

(10) Patent No.: US 11,892,334 B2
(45) Date of Patent: Feb. 6, 2024

(54) AUTOMATIC DISPENSING SYSTEM

(71) Applicant: Spicerr, LTD., RaAnana (IL)

(72) Inventors: Tomer Eden, Herzeliya (IL); Rahav Cohen, Kfar-Saba (IL)

(73) Assignee: Spicerr Ltd., RaAnana (IL)

( * ) Notice: Subject to any disclaimer, the term of this patent is extended or adjusted under 35 U.S.C. 154(b) by 166 days.

(21) Appl. No.: 17/308,628

(22) Filed: May 5, 2021

(65) Prior Publication Data
US 2021/0255015 A1    Aug. 19, 2021

Related U.S. Application Data

(63) Continuation of application No. PCT/US2019/060535, filed on Nov. 8, 2019.

(60) Provisional application No. 62/757,176, filed on Nov. 8, 2018.

(51) Int. Cl.
*G01F 11/00* (2006.01)
*A47J 47/01* (2006.01)
*B65D 77/04* (2006.01)
*B65D 83/06* (2006.01)
*G01F 11/02* (2006.01)

(52) U.S. Cl.
CPC ............ *G01F 11/003* (2013.01); *A47J 47/01* (2013.01); *B65D 77/048* (2013.01); *B65D 83/06* (2013.01); *G01F 11/006* (2013.01); *G01F 11/029* (2013.01)

(58) Field of Classification Search
CPC .... G01F 11/003; G01F 11/006; G01F 11/029; A47J 47/01; B65D 77/048; B65D 83/06
See application file for complete search history.

(56) References Cited

U.S. PATENT DOCUMENTS

| 4,288,006 | A | 9/1981 | Clover, Jr. |
| 5,884,808 | A | 3/1999 | Muderlak et al. |
| 10,064,521 | B1 | 9/2018 | Gawali et al. |
| 10,203,235 | B1* | 2/2019 | Gottfried ............. B65D 51/245 |
| 10,837,817 | B1* | 11/2020 | Kadoch ................. G01F 11/025 |

(Continued)

FOREIGN PATENT DOCUMENTS

| EP | 0481250 A1 | 4/1992 |
| EP | 3877730 | 9/2021 |

(Continued)

OTHER PUBLICATIONS

International Search Report and the Written Opinion dated Sep. 30, 2021 From the International Searching Authority Re. Application No. PCT/IB2021/054716. (7 Pages).

(Continued)

*Primary Examiner* — Jeremy Carroll

(57) ABSTRACT

A dispensing device for dispensing material. The dispensing device comprises a dispensing head; a capsule magazine including at least one void; at least one material capsule, wherein the at least one material capsule is disposed within the at least one void in the material capsule magazine; a motor, operable to provide mechanical power for material dispensing operations, wherein the motor is disposed within the dispensing head; and a gear mechanically connected to the motor, wherein the gear is further disposed in connection with the at least one material capsule, such that operation of the motor causes rotation of the gear and, in turn rotation of the at least one material capsule.

32 Claims, 37 Drawing Sheets

(56) References Cited

U.S. PATENT DOCUMENTS

| | | |
|---|---|---|
| 2008/0037405 A1 | 2/2008 | Fujita et al. |
| 2013/0149679 A1 | 6/2013 | Tokuda et al. |
| 2014/0034674 A1 | 2/2014 | Engels et al. |
| 2016/0081515 A1 | 3/2016 | Aboujassoum et al. |
| 2016/0374486 A1* | 12/2016 | Yu .......................... A47G 19/34 426/416 |
| 2017/0000295 A1 | 1/2017 | Hanna et al. |
| 2020/0108164 A1* | 4/2020 | Samain ................... A61L 9/122 |
| 2021/0025501 A1 | 1/2021 | Dalton et al. |
| 2023/0215293 A1 | 7/2023 | Eden |

FOREIGN PATENT DOCUMENTS

| | | |
|---|---|---|
| WO | 2011001397 A2 | 1/2011 |
| WO | WO 2016/133894 | 8/2016 |
| WO | WO 2017/155829 | 9/2017 |
| WO | 2019061971 A1 | 4/2019 |
| WO | WO 2020/097503 | 5/2020 |
| WO | WO 2021/240474 | 12/2021 |

OTHER PUBLICATIONS

International Preliminary Report on Patentability dated Dec. 8, 2022 From the International Bureau of WIPO Re. Application No. PCT/IL2021/054716. (6 Pages).

Supplementary European Search Report and the European Search Opinion dated Apr. 26, 2020 From the European Patent Office Re. Application No. 19880971.7. (9 Pages).

International Preliminary Report on Patentability dated May 11, 2021 From the International Bureau of WIPO Re. Application No. PCT/US2019/060535. (7 Pages).

International Search Report and Written Opinion of International Searching Authority for PCT/US2019/060535, ISA/RU, Moscow, Russia, dated Feb. 19, 2020.

* cited by examiner

AUTOMATIC DISPENSING SYSTEM

CROSS-REFERENCE TO RELATED APPLICATIONS

This application is a continuation of PCT Application No. PCT/US19/60535 filed on Nov. 8, 2019, which claims the benefit of U.S. Provisional Application No. 62/757,176 filed on Nov. 8, 2018. The contents of the above-referenced applications are hereby incorporated by reference.

TECHNICAL FIELD

The present disclosure relates generally to powder, seed, and liquid dispensing, and more particularly to devices for dispensing powders, seeds, and liquids.

BACKGROUND

Spices are commonly used around the world and there are various methods for doing that. Spices can be consumed in their original form (fresh/dehydrated herb or plant), ground or milled. The spices can be ground at home (by the end user) or can be bought ground. Spices may include salt, black pepper, paprika, ginger, oregano, basil, cumin, olive oil, balsamic vinegar, lemon juice and many more.

Current methods for dispensing spices require the separate measurement of individual spices, which may prove imprecise and time-consuming. Current spice-dispensing systems may require users to manually measure the amounts of individual spices to be used, either by weight or by volume. This technique may prove imprecise, as spices may vary in density and potency for a variety of reasons including settling during shipment, the spices' origins, and the mode of storage. Furthermore, the manual measurement of spices may prove time-consuming as multiple spices may be required for a recipe, each requiring a separate measurement, possibly at a certain stage of the recipe.

Furthermore, traditional spice-dispensing systems lack compatibility with the Internet of Things (IoT). Because traditional spice-dispensing systems cannot connect with data processing or other computer systems, traditional spice-dispensing systems are not equipped to automatically measure spices in proportion for a recipe, to re-order spices automatically, or to collect user feedback.

Finally, the use of traditional spice-dispensing systems introduces the possibility of non-standard dispensations or contamination. As traditional spice-dispensing systems incorporate non-standard spice blends from a variety of sources, a measure of a specific spice may result in differing flavors for consumers dispensing the same spice from different sources. Further, as spice sources may be non-standardized, contaminants may enter the spice supply, either during production, shipping, retail, or storage, which may cause discolorations, variations in flavors, or, possibly, sickness.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed include a dispensing device for dispensing material. The dispensing device comprises a dispensing head; a capsule magazine including at least one void; at least one material capsule, having a tubular shape, wherein the at least one material capsule is disposed within the at least one void in the material capsule magazine; a motor, operable to provide mechanical power for material dispensing operations, wherein the motor is disposed within the dispensing head; and a gear mechanically connected to the motor, wherein the gear is further disposed in connection with the at least one material capsule such that operation of the motor causes rotation of the gear and, in turn rotation of the at least one material capsule.

Certain embodiments disclosed also include a material capsule operable in a dispensing device for dispensing material. The material capsule comprises: a hollow barrier adapted to contain material to be dispensed, wherein the barrier open at one end; a pushing element adapted to push the material toward at least an opening; a dispensing element adapted to dispense the material contained in the barrier; and a blocking mechanism adapted to block the flow of the dispensed material.

Certain embodiments disclosed further include a dispensing material system. The dispensing material system comprises: a dispensing device for dispensing material; and an external user device installed with an agent, wherein the agent when executed by the external user device is configured to control the dispensing device and collect data related to the dispensed material.

In addition, certain embodiments disclosed include a material capsule operable in a dispensing device for dispensing material. The material capsule operable in a dispensing device for dispensing material comprises: a hollow barrier adapted to contain material to be dispensed, wherein the barrier is open at one end; a dispensing element adapted to dispense the material contained in the barrier; wherein the dispensing element further comprises: a pump head, wherein the pump head includes a sink, a pump body, a dispensing aperture, at least one pump wheel, and a flexible barrier.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
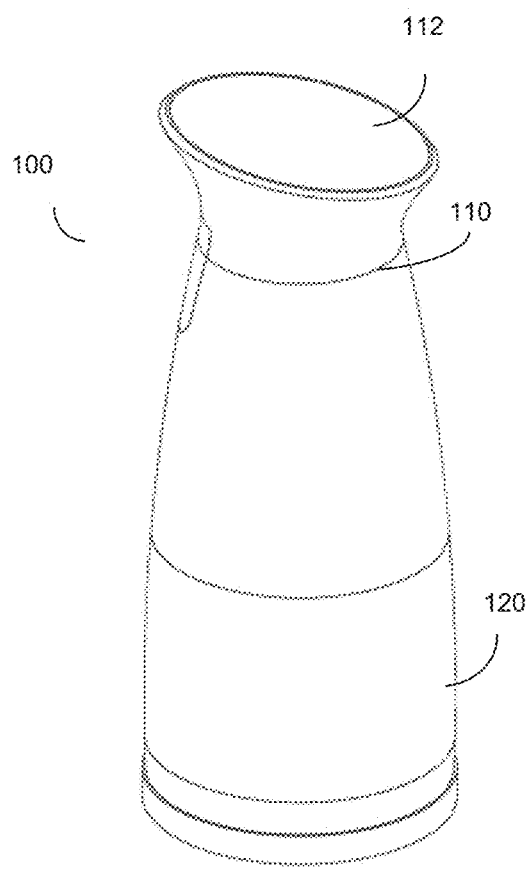
FIG. 1A is a depiction of a dispensing device for dispensing spices according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1A is a depiction of a dispensing device for dispensing spices according to an embodiment. In this example embodiment, the device 100 includes a predefined number (e.g., eight) of free-standing capsules 130. In an embodiment, at least one of the capsules 130 may be inserted into a capsule magazine 120, where the capsule magazine 120 attaches to the dispensing device head 110 and provides material 131 for dispensation.

In an example embodiment, the dispensing device includes a trigger 111 which, when pressed by a user, causes a selected spice to be dispensed. In an embodiment, the dispensing device includes a display 112, a memory 113, and a processing circuitry 114, which allow for the dispensing of material 131 according to recipes downloaded to the device.

In an embodiment, the dispensing device also includes a capsule magazine 120 which may be attached to the device. In an embodiment, the capsule magazine 120 may contain at least one capsule 130. In an embodiment, the capsule magazine 120 may be rotated relative to the device head 110 to align a capsule 130 for dispensation, thereby selecting an "active" capsule 121 from those installed in the magazine.

In an embodiment, the capsule magazine 120 may be filled or emptied by inserting and removing capsules 130 from slots in the capsule magazine 120, allowing a user to exchange capsules 130 in a magazine 120. The capsule magazine 120 may be removed from or attached to the dispensing device head 110, allowing a user to exchange capsule magazines 120. A user may exchange capsule magazines 120 corresponding to various spice profiles including, without limitation, profiles for different foods, dishes, flavor themes, and the like.

In an example embodiment, the capsules 130 may be filled with material 131 including, without limitation, spices, powders, seeds, liquids, or the like. In an embodiment, the capsules may be pre-filled with material 131. In an embodiment, the capsules may be marked for recognition by the dispensing device by means including, without limitation, NFC tags, RFID tags, QR codes, bar codes, and the like.

In an embodiment, the capsules may include pushing elements 132 for pushing the material toward the opening or compacting or pressurizing the material contained. In an embodiment, the capsules may include dispensing elements for dispensing the material contained, the mechanisms 133 including, without limitation, pumps 135, scrapers 134, and the like. In an embodiment, the capsules may include block mechanism 136 for blocking or limiting the flow of dispensed materials, the mechanisms 136 including, without limitation, shut-off valves and the like.

In an embodiment, the dispensing device 100 may be connected to a user device 150 such as a smartphone, tablet, or computer to send usage data and/or receive flavor profiles. In an embodiment, the dispensing device 100 may connect with the user device via a wireless or wired communication protocol including, without limitation, Bluetooth®, Wi-Fi, and the like.

Figure 1B:
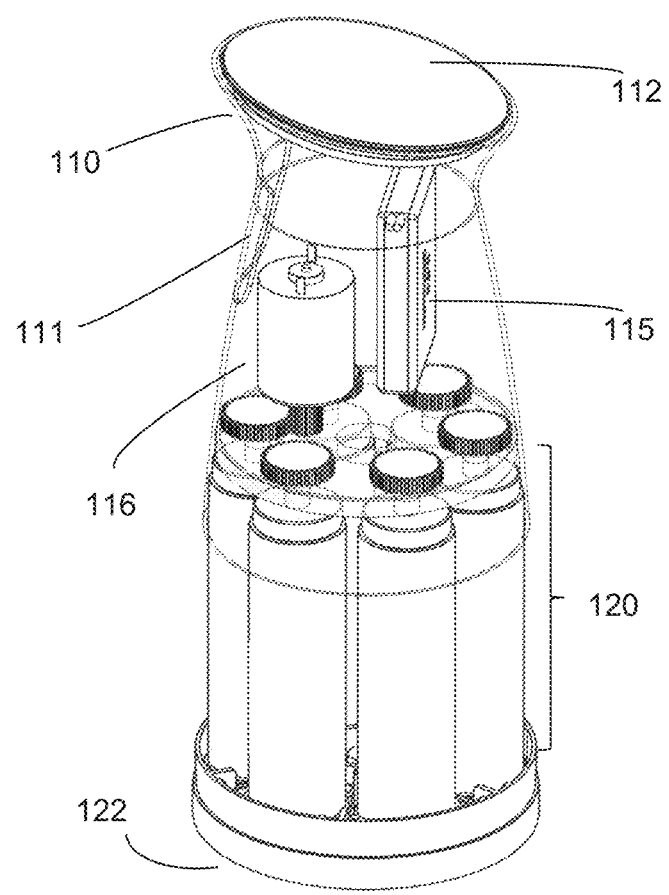
FIG. 1B is a right-isometric view of the dispensing device, of FIG. 1A according to an embodiment.

FIG. 1B is a right-isometric view of the dispensing device 100, of FIG. 1A according to an embodiment. Note that some components hidden to show internal structure. In the example embodiment, the dispensing device includes an axis, a device head 110, a capsule magazine 120, and a plurality of capsules 130.

The dispensing device head 110 may include a display 112, a trigger 111, a battery 115, a motor 116, and a gear 117. In the example embodiment, the display 112 may be configured to show information related to device status and dispensing operations including, without limitation, remaining battery life, the "active" capsule, relevant spicing profiles, the amount of spice to be dispensed, and the like. In an embodiment, the dispensing device head 110 may include a sensor configured to read a code attached to each capsule to determine the capsules' contents by means including, without limitation, NFC, RFID, QR code, barcode, and the like.

In the example embodiment, the trigger 111 may be configured as a switch, controlling the flow of electrical power from the battery 115 to the motor 116. The flow of electrical power from the battery 115 to the motor 116 may cause the motor 116 to turn a connecting member 118. In the rotation of the connecting member 118, extending from the motor 116 in the device head 110 to the gear 117, which substantially contacts a toothed gear element 137 near the top of the capsule 130, causes the attached gear 117 to rotate, thereby causing the "active" capsule 121 to rotate by engaging the toothed gear element 137 near the top of the capsule 130.

In the example embodiment, the capsule magazine 120 contains a plurality of capsules 130 and a charging stand 122. One capsule at a time is the "active" capsule 121, selected for dispensation. The capsule magazine 120 may be configured to rotate about the axis of the device, allowing the user to select an "active" capsule 121 containing a material 131 for dispensation. In an embodiment, the user may select the "active" capsule 121 by means including, without limitation, manual rotation of the capsule magazine 120, selection of capsules 130 through device displays and controls, selection of capsules through external devices such as smartphones, and the like.

In an embodiment, the capsule magazine includes a charging stand 122 affixed to the base of the capsule magazine 120. The charging stand 122 may be configured to, in conjunction with an external power supply, recharge the battery 115. In addition, the external power supply may be, without limitation, an AC adapter, a wireless charging station, an induction charging station, and the like.

In an embodiment, the capsule 130 includes a contained material 131, a pusher 220, a pushing element 132, a dispensing element, and an end cap. In an embodiment, the dispensing element may include, without limitation, scrapers 134, pumps 135, and the like, configured to dispense material 131 in controlled amounts depending on the rotation of the capsule 130.

In an embodiment, the dispensing element may be a scraper 134, configured such that rotation of the capsule turns the contained material 131, pushing the material against the scraper's blade, scraping loose an amount of material 131 for dispensation through an aperture in the dispensing element.

In an embodiment, the dispensing element may be a pump 135, configured such that rotation of the capsule 130 in a first direction turns a set of wheels over a flexible barrier, creating pockets of material within the barrier, which further rotation of the capsule 130 pushes toward the aperture of the dispensing element for dispensation. In an embodiment, the pump 135 may be configured such that rotation of the capsule 130 in a second direction, opposite the first direction, causes liquid remaining in the flexible barrier to return to the capsule 130 for stable storage.

In an embodiment, each capsule 130 may be configured to engage with the gear 117 via a toothed gear mechanism 137 disposed near the top of the capsule 130. In an embodiment, the capsule's 130 engagement with the gear 117 may render the capsule 130 rotatable via the motor 116, allowing a user to control the rotation of capsules 130 and, thus, the dispensation of materials 131, via the trigger 111.

Figure 1C:
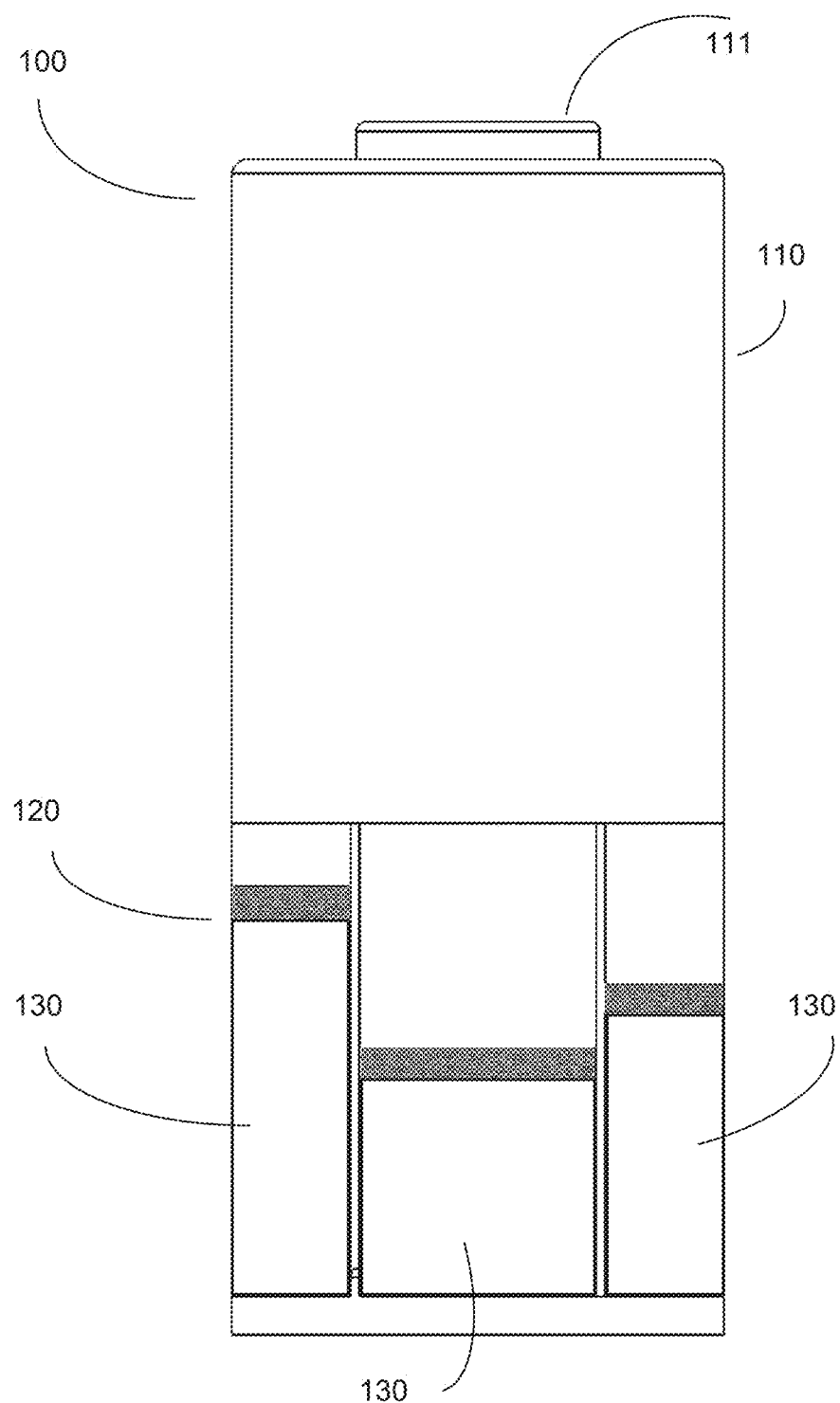
FIG. 1C is a forward view of a dispensing device according to an embodiment.

FIG. 1C is a forward view of a dispensing device 100 according to an embodiment. In the example embodiment, the dispensing device 100 includes a dispensing device head 110, a capsule magazine 120, and a plurality of capsules 130. In an embodiment, such as in the example embodiment, the capsule magazine 120 may include a transparent viewing window 123, allowing a user to observe the capsules 130 in the capsule magazine 120. In an embodiment, such as in the example embodiment, each of the plurality of capsules 130 may be transparent, allowing a user to observe the contents of the capsules 130.

Figure 1D:
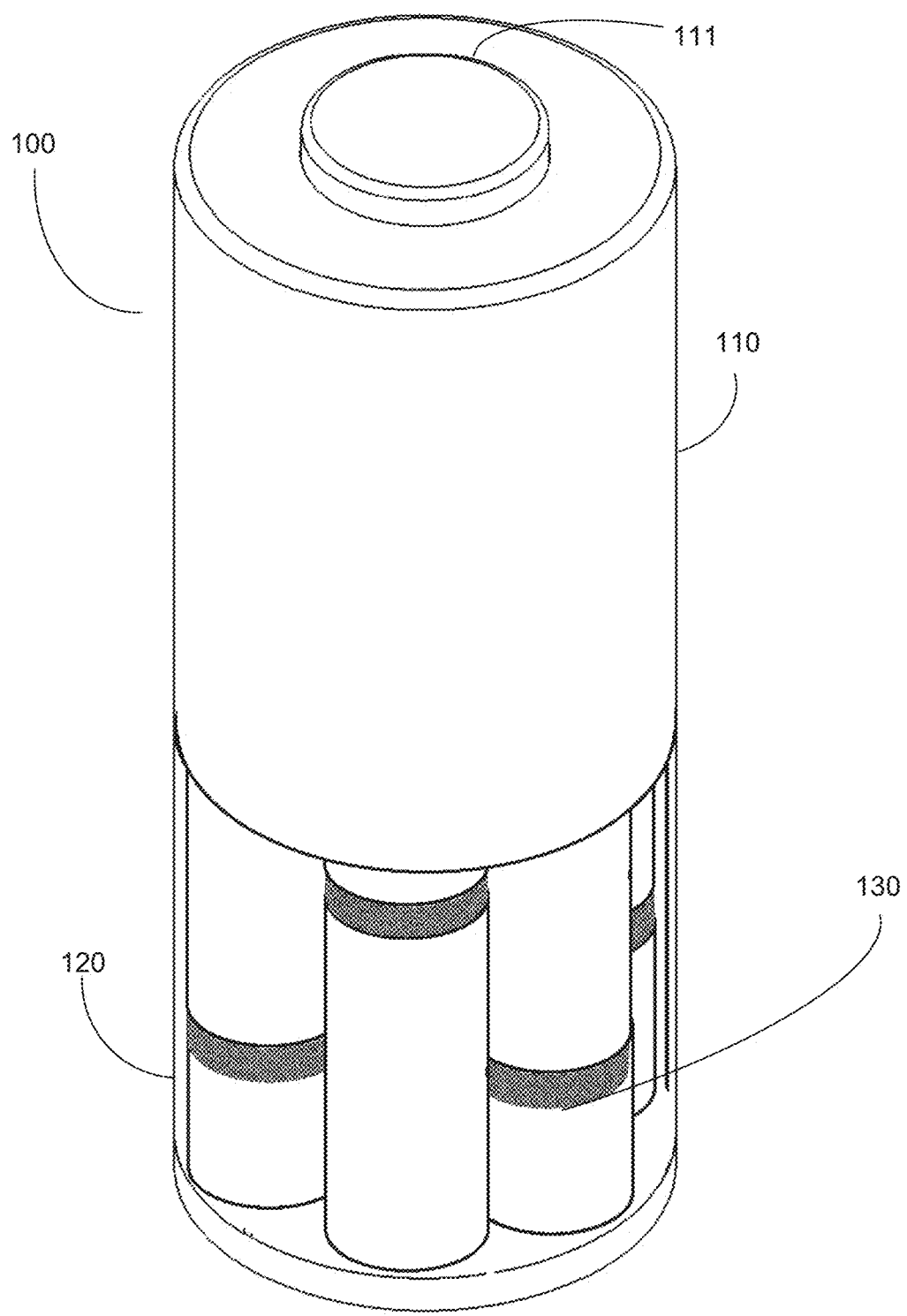
FIG. 1D is a left-isometric view of a dispensing device according to an embodiment.

FIG. 1D is a left-isometric view of a dispensing device 100 according to an embodiment. In the example embodiment, the device 100 includes a dispensing device head 110, a capsule magazine 120, and a plurality of capsules 130.

Figure 1E:
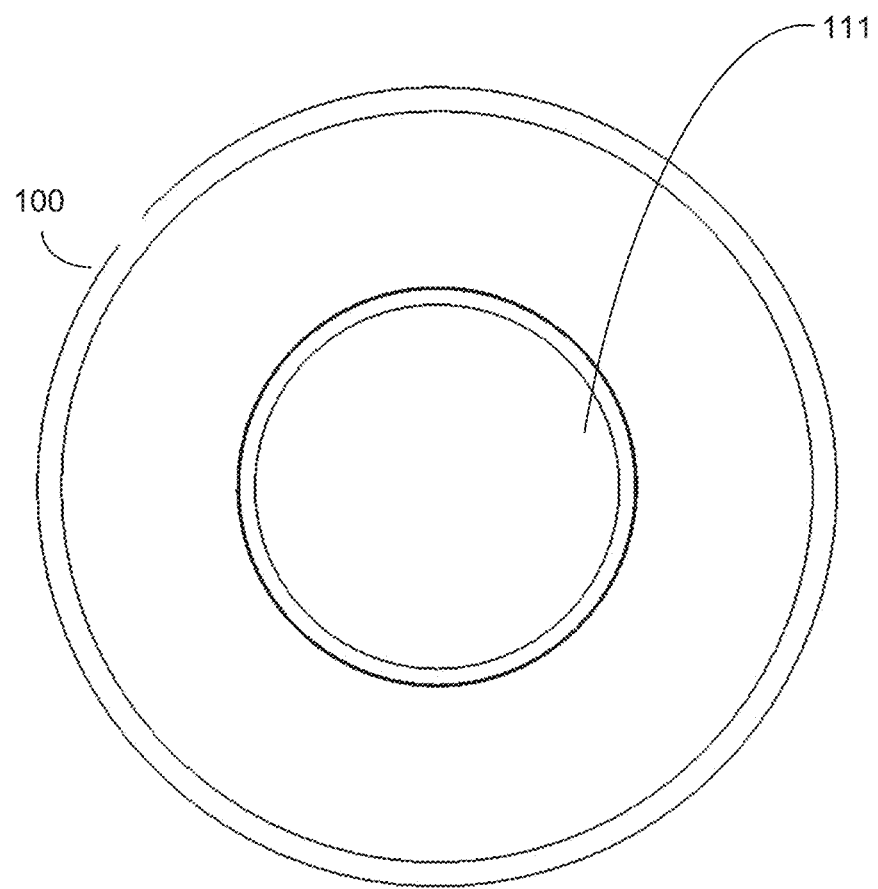
FIG. 1E is a top view of a dispensing device according to an embodiment.

FIG. 1E is a top view of a dispensing device 100 according to an embodiment. In an example embodiment, the dispensing device 100 includes a dispensing device head 110, a capsule magazine 120, and a plurality of capsules 130. In the example FIG. 1E, the dispensing device head 110 is visible. In an embodiment, the surface of the dispensing device head may include, without limitation, displays, switches, buttons, triggers, and the like.

Figure 1F:
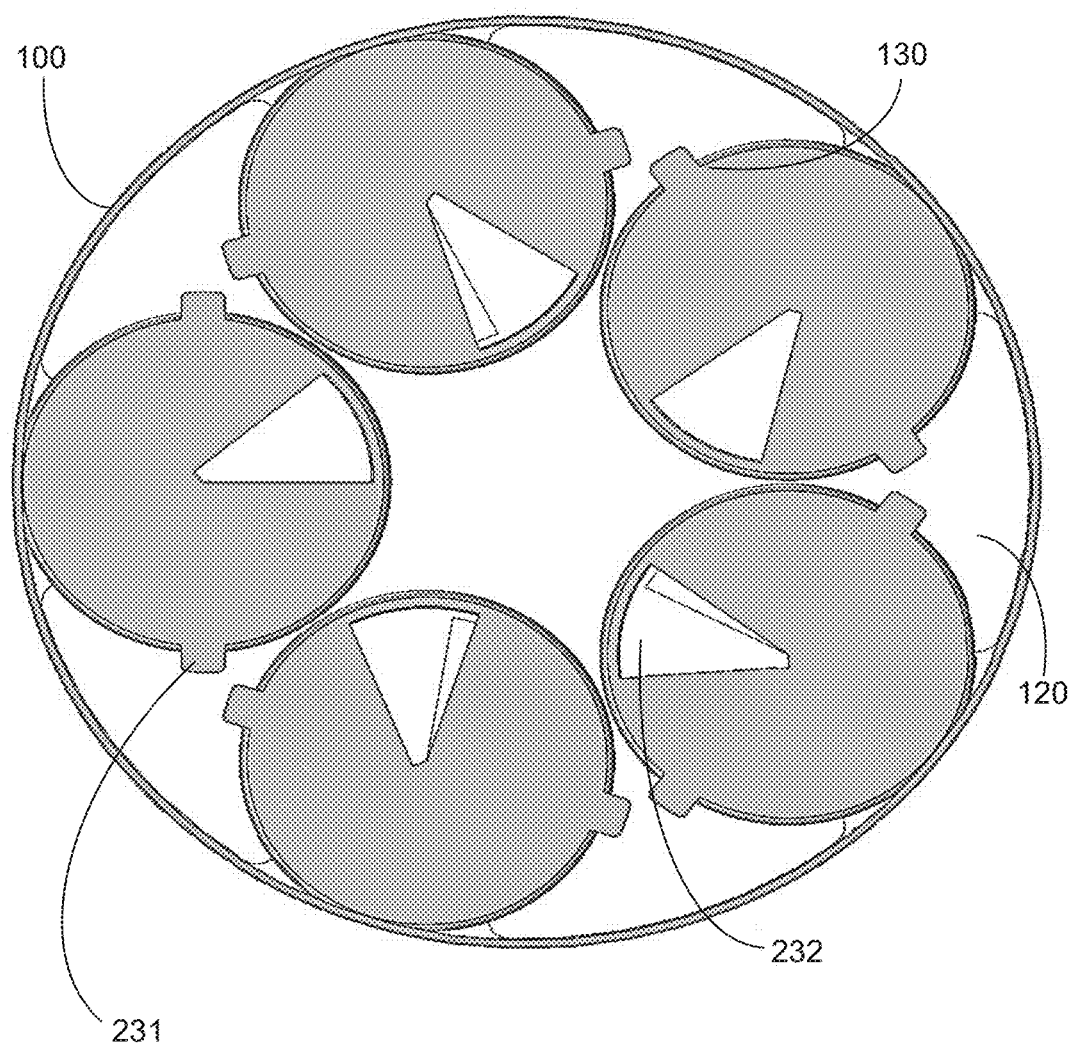
FIG. 1F is a bottom view of a dispensing device according to an embodiment.

FIG. 1F is a bottom view of a dispensing device 100 according to an embodiment. In the example embodiment, the device includes a dispensing device head 110, a capsule magazine 120, and a plurality of capsules 130. In the exemplary depiction, the capsule magazine 120 and plurality of capsules 130, and the capsules' included end cap orientation tabs 231 and apertures 232, are visible. In the exemplary embodiment, a plurality of capsules 130 are disposed at equal spacings in a circular pattern within the capsule magazine 120. In the exemplary embodiment, the capsules' end cap apertures 232 are in closed states. In an embodiment, an "active" capsule 121 may be selected by rotation of the capsule magazine 120 by methods including, without limitation, manual rotation, computer-controlled rotation, and the like.

Figure 1G:
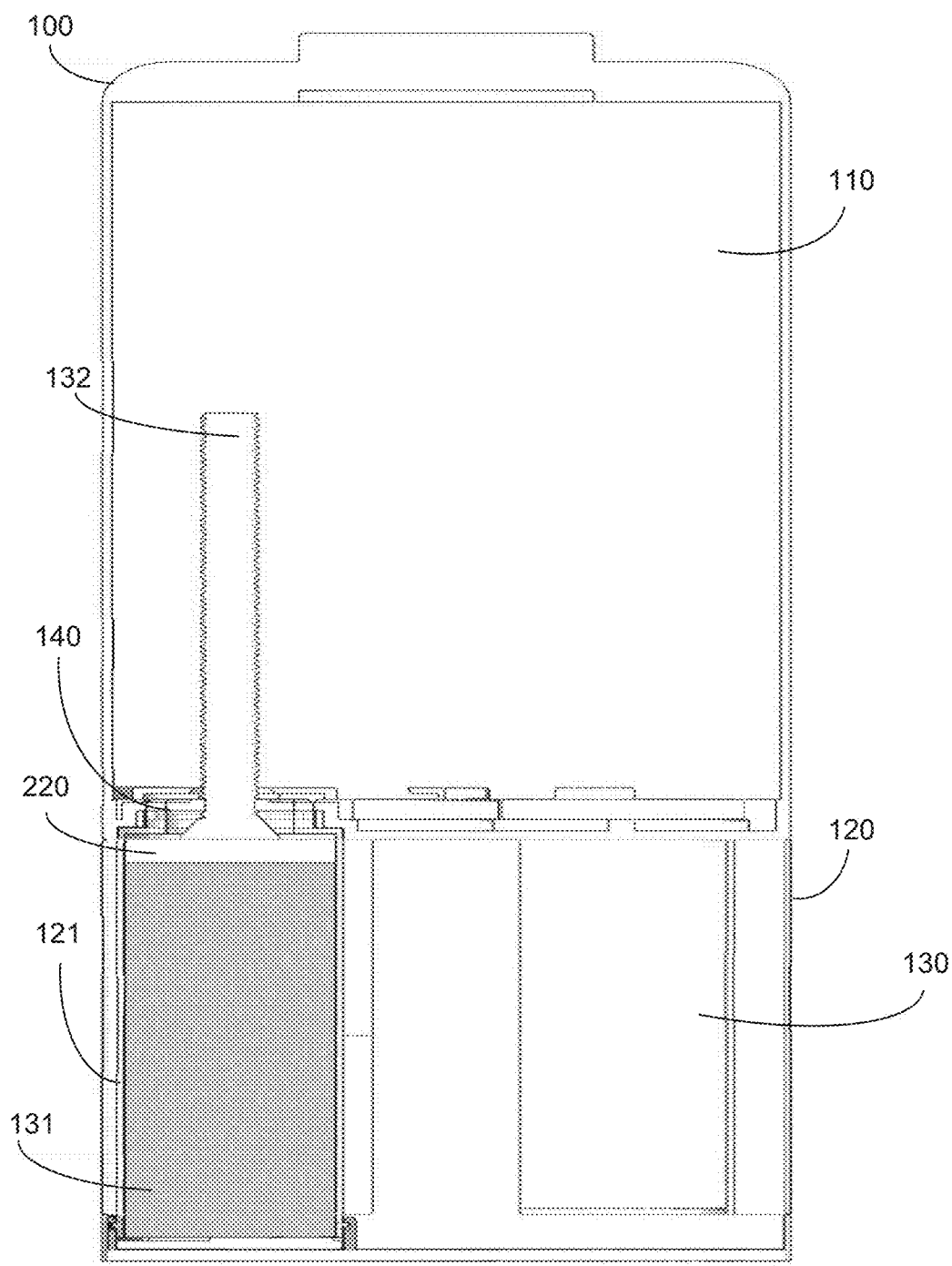
FIG. 1G is a forward cross-section of a dispensing device according to an embodiment.

FIG. 1G is a forward cross-section of a dispensing device 100 according to an embodiment. In an example embodiment, the device 100 includes a dispensing device head 110, a capsule magazine 120, and a plurality of capsules 130, including a locking hub 140 and a pusher 220. In an example embodiment, a capsule is selected as the "active" capsule 121, and is displayed in contrast, its enclosed material 131 having a dark highlight in the depiction.

In an example embodiment, the capsule 130 includes a locking hub 140. In an embodiment, the locking hub 140 may be disposed at an end of the capsule 130, opposite the end cap 230. In an embodiment, the locking hub 140 may be configured to engage with locking appendages of the dispensing device head 110. In an embodiment, the capsule 130 is secured to the dispensing device head 110 via a set of locking appendages which contract to grip the locking hub 140, and which may expand to release the locking hub 140. The operation of the locking appendages may be controlled manually, through user activation, or may be automatic. In an embodiment, the locking appendages may be configured to automatically secure or release the capsule 130 upon detection of events such as, without limitation, selection of a new "active" capsule 121, selection of a new capsule magazine 120, and the like.

In the example embodiment, the device includes a pusher 220 and a pushing element 132 of the screw actuator type. In an embodiment, the pusher may be active, such as a screw-type or rack and pinion actuator, or passive, such as a compression spring or an air spring.

In an embodiment, the dispensing device 100 may be configured to accept a capsule having a geometry other than that discussed, and to dispense material from such a capsule, provided that the capsule supports a mechanism providing for controlled dispensation of material upon rotation.

In an embodiment, the dispensing device 100 may be configured to receive, from the system, automatic or semi-automatic flavoring and dispensing programs instructing the dispensing device 100 of how to use the capsules 130. The programs that are sent to the dispensing device 100 guide the dispensing device 100 with information including, without limitation, which capsules to use, what are the quantities from each capsule, the precise usage, timing, and dispensing type (how the motor should operate for dispensing the content of the capsule e.g. how fast/intense), and the like. The programs may be generated by the system by a set of algorithms according to a list of ingredients, a recipe, and a user's culinary preferences, or may be created by the user manually by specifying the program or saving his/her preferred past usage (e.g. "save my last sequence of flavoring as 'my spicy omelet'").

Figure 2A:
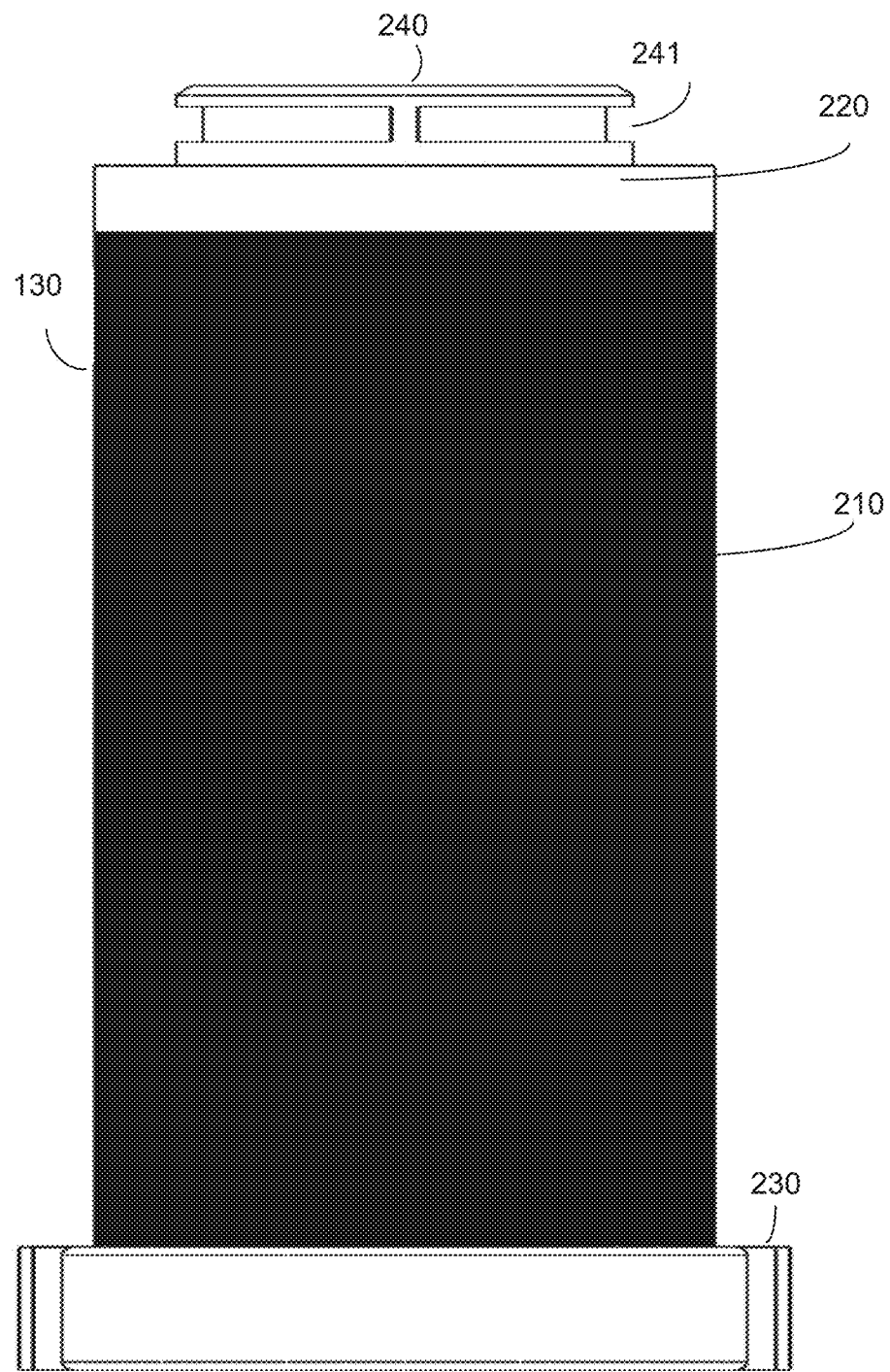
FIG. 2A is a forward view of a single capsule in its full state.

FIG. 2A is a forward view of a single capsule 130 in its full state. The capsule includes a material 210, a pusher 220, an end cap 230, and a locking hub 240. In an embodiment, the pusher 220 may be configured to compact or pressurize the contained material 210, ensuring a uniform density and consistency for dispensation, and sealing the capsule against outside air and contaminants to preserve quality and freshness.

In an example embodiment, the pusher 220 is a circular plate, having first and second sides, wherein the second side contacts the material 210 contained and exerts a force proportional to the force exerted on the first side. In an embodiment, a force may be applied to the first side of the pusher 220 by means including, without limitation, passive means, such as compression springs and air springs, or active means, such as screw linear actuators and rack and pinion actuators.

In an embodiment, the pusher 220 may be an internal means for applying a force to the encapsulated material 131, including, without limitation, a spring, an air spring, and the like. In an embodiment, the pusher 220 may be a means for applying a force to the encapsulated material 131, external to the capsule 130, such that the external pusher 220 applies pressure to every capsule 130. The external pusher may be a mechanism including, without limitation, a screw-type linear actuator, a rack and pinion actuator, and the like.

Figure 2B:
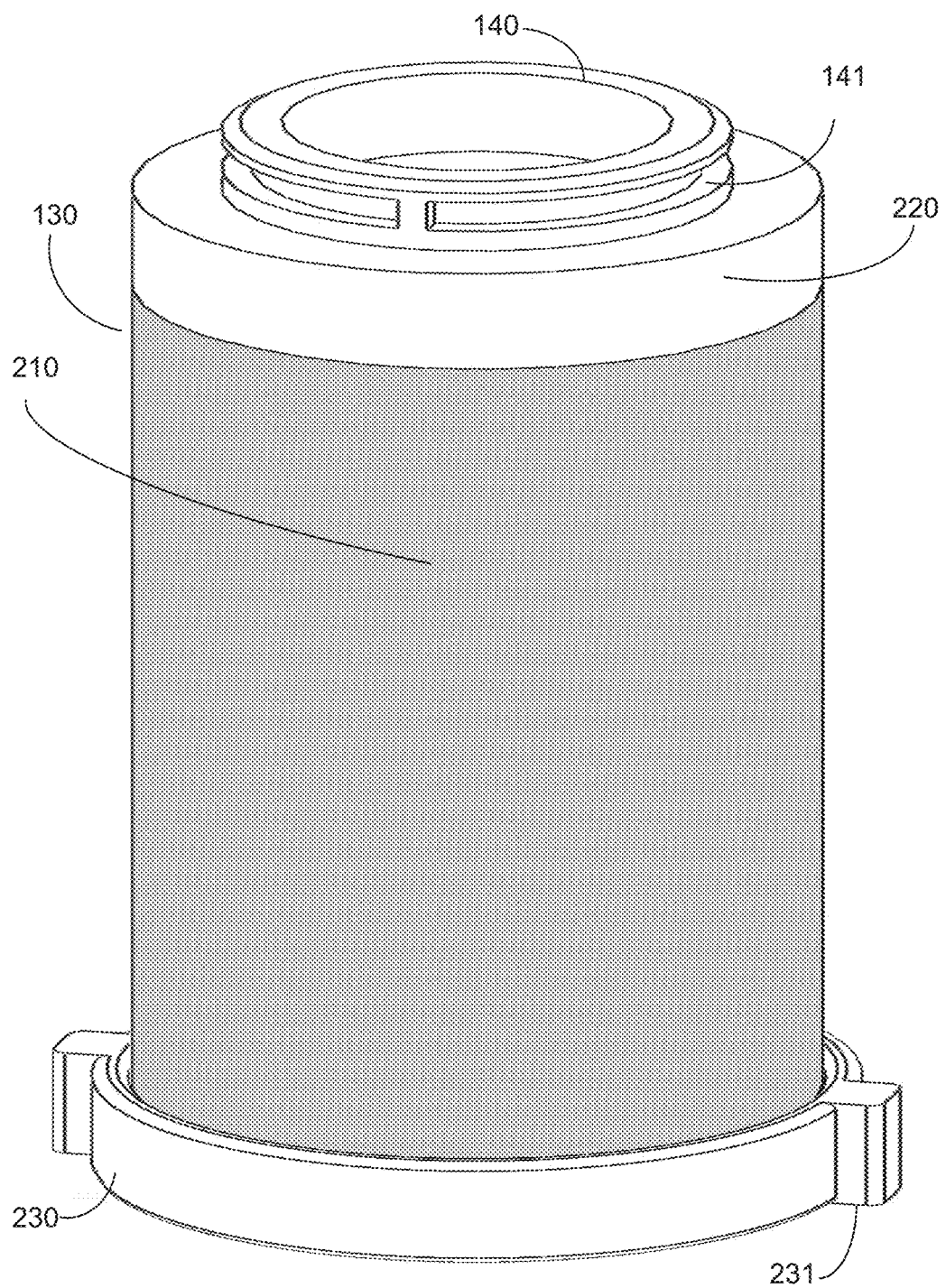
FIG. 2B is an isometric view of a single capsule in its full state.

FIG. 2B is an isometric view of a single capsule 130 in its full state. In an example embodiment, the capsule includes an end cap 230, including orientation tabs 231. The orientation tabs 231 may be aligned with corresponding apertures in the capsule magazine 120 to achieve a secure and stable placement of the capsule within the capsule magazine 120 and to hold the end cap 230 from rotating, while rotating the capsule.

Figure 2C:
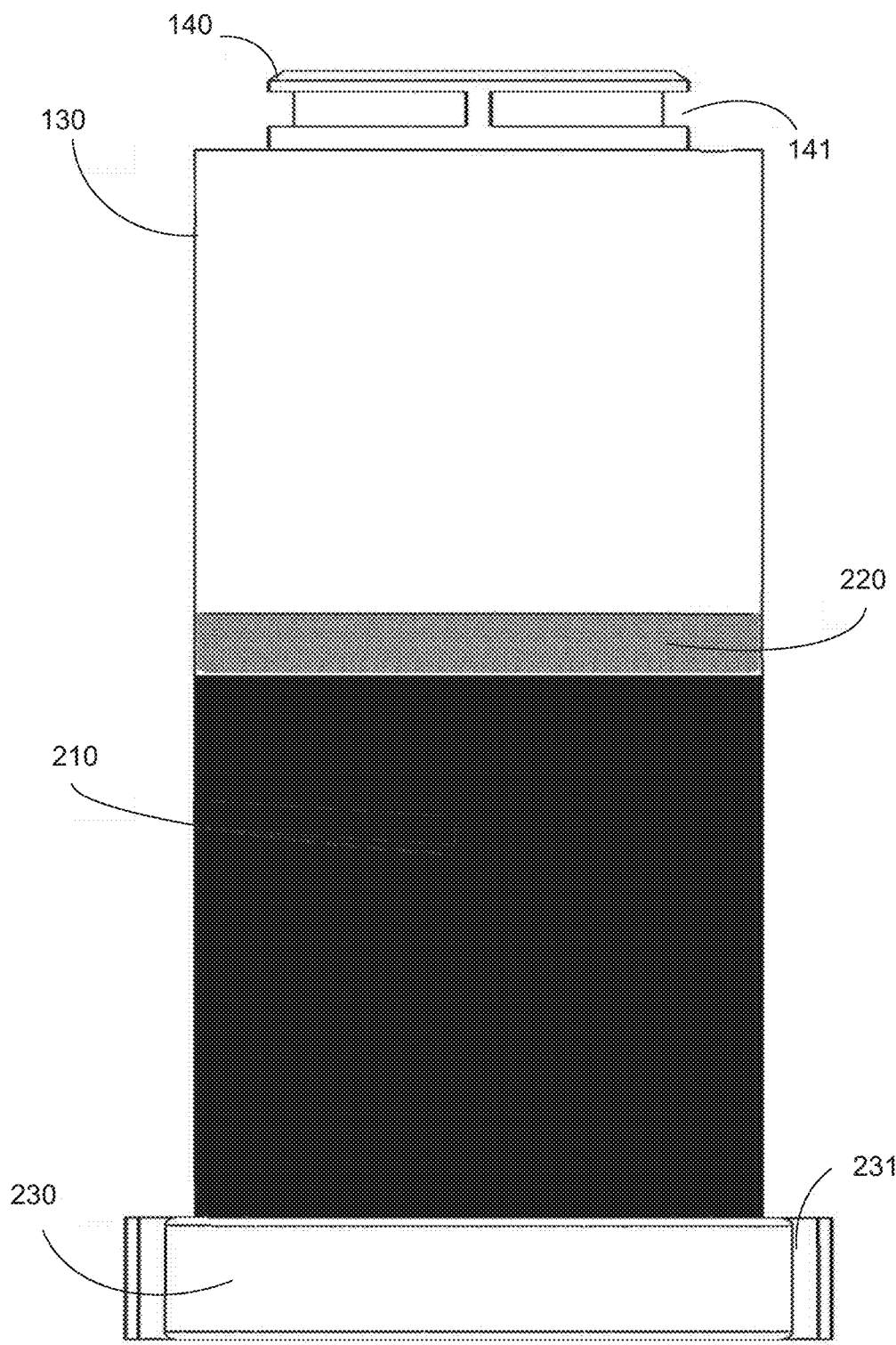
FIG. 2C is a forward view of a single capsule in a half-full state.

FIG. 2C is a forward view of a single capsule 130 in a half-full state. The material 210 contained within the capsule 130 may be dispensed incrementally, with a calibrated unit of material dispensed per each unit of motor 116 action, wherein units of motor 116 action include, without limitation, motor time, motor turns, and motor torque.

In an embodiment, the dispensing device 100 may determine the quantity of material 131 dispensed according to factors including, without limitation, the type of capsule and the capsule's contents, the number of motor operation units completed in the current dispensing sequence, the movement of the pusher during the current dispensing sequence, the quantity of material dispensed per unit of motor operation and per unit of pusher movement, and the like. The determination of the values of relevant factors for calculation of material dispensation quantity may be made through data collection from sources including, without limitation, information elements attached to the plurality of capsules, a local memory chip containing configuration data such as, but not limited to, an amount of material of a certain type dispensed per motor operation unit, a central system managing dispensing device configuration data, and the like.

In an embodiment, the dispensing device 100 may be configured to collect usage data regarding dispensing operations. The dispensing device may be configured to collect information including, without limitation, the capsules 130 used, the amount of material 131 dispensed, and the date and time of dispensation. In an embodiment, the dispensing device may be configured to transmit the collected data, directly or through a mobile device such as smartphone, to a central system, such as a server or cloud service, whereby the central system may apply the transmitted information for services including, without limitation, collection of data related to dispenser and capsule usage, means by which users may order new capsules or devices, pushing updates and configuration data to dispensers, pushing spicing programs to dispensers, displaying messages to users such as commercial information, recipes, and diet and health information, and other like services.

Figure 2D:
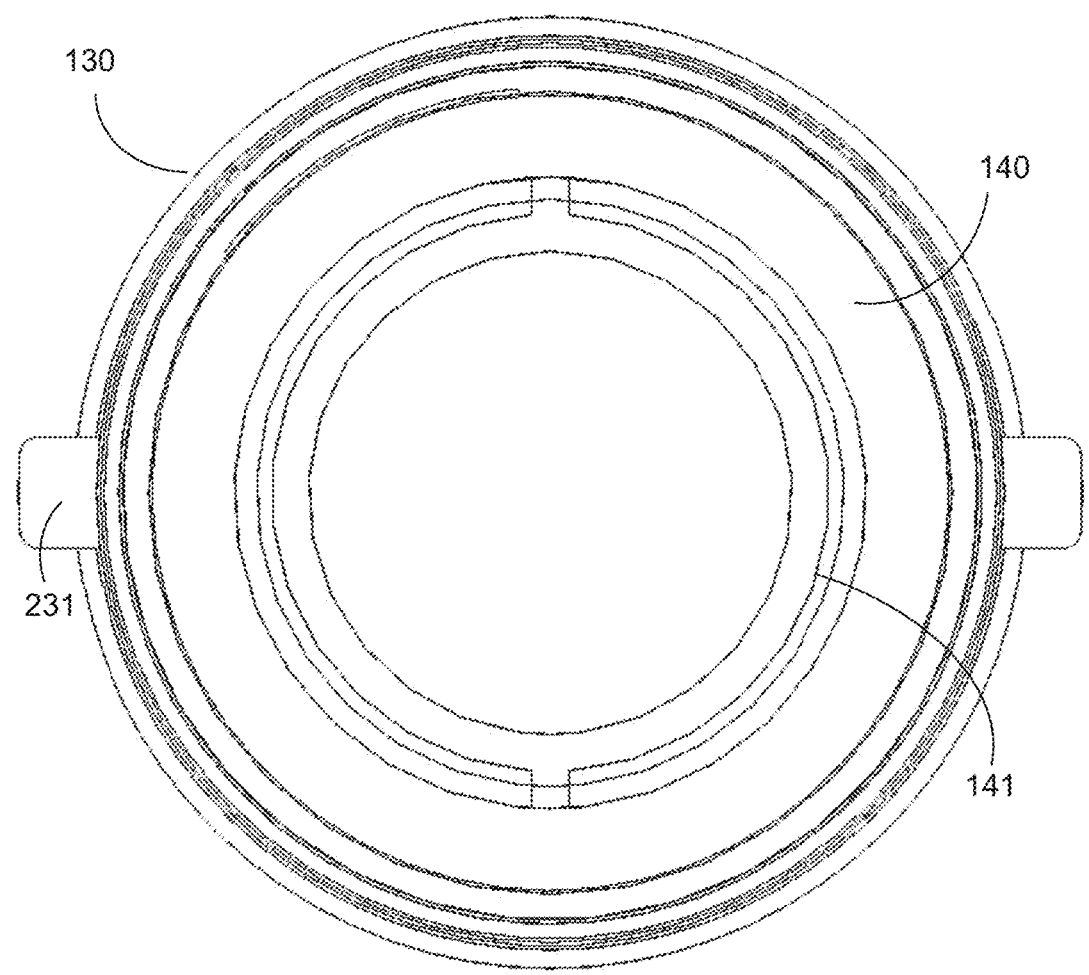
FIG. 2D is a top view of a single capsule according to an embodiment.

FIG. 2D is a top view of a single capsule 130 according to an embodiment. In an embodiment, the capsule 130 may include a locking hub 240, which may include a groove 141 configured to secure at least one locking appendage to the capsule 130. In an embodiment, the at least one locking appendage may include a gripping arm, a gripping ring, and the like.

Figure 2E:
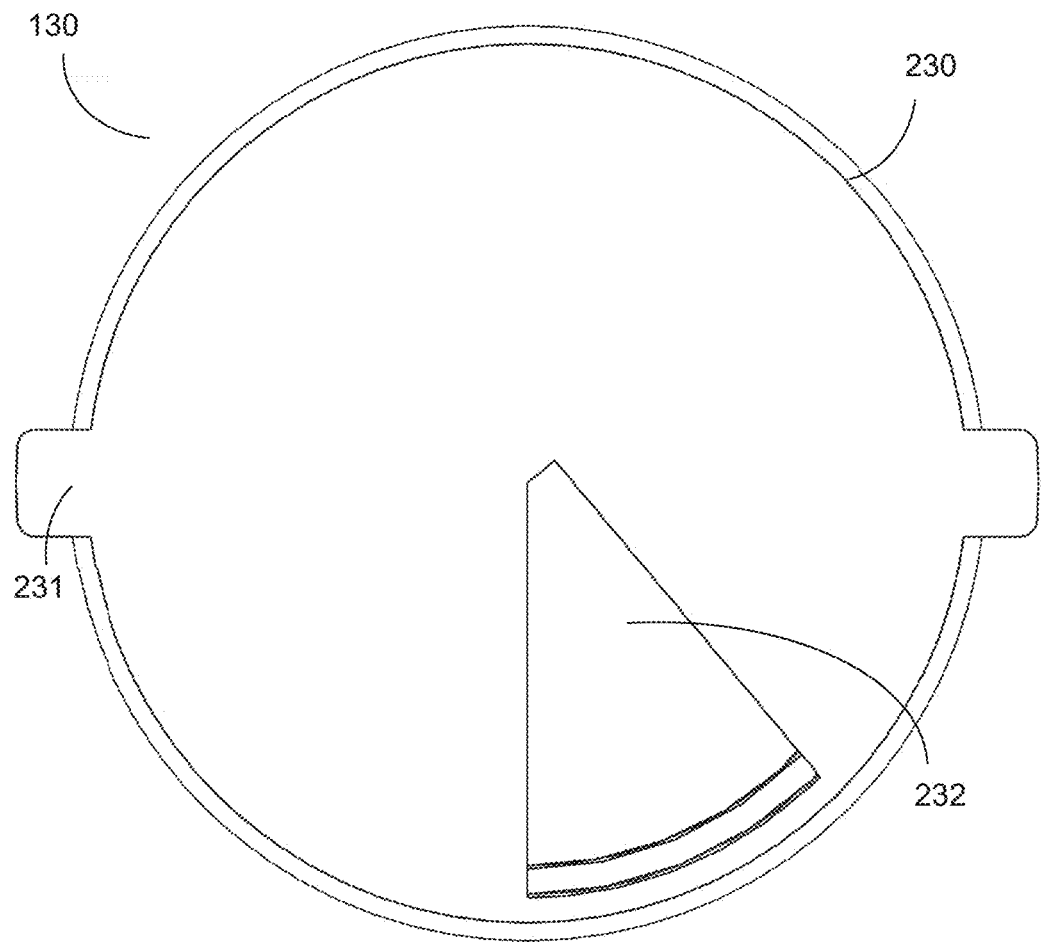
FIG. 2E is a bottom view of a single capsule according to an embodiment.

FIG. 2E is a bottom view of a single capsule 130 according to an embodiment. In an embodiment, the capsule 130 may include an end cap 230, disposed at an end of the capsule 130 opposite the locking hub 240. In an embodiment, the end cap may include an aperture 232 through which dispensed material 210 may pass. In an embodiment, the end cap 230 may be freely rotatable relative to the capsule 130, such that the aperture 232 included in the end cap may be open, semi-closed, or closed.

In an embodiment, the rotation of the end cap 230 relative to the capsule 130 may render the end cap aperture 232 in open, semi-open, and closed states. While the configuration of the end cap aperture 232 may restrict the dispensation of material 131, the measurement of material dispensed is achieved through control of the motor 116, with calibrated material dispensations occurring per each unit of motor 116 activity.

In an embodiment, the end cap 230 may be configured to rotate relative to the capsule 130 at predefined events during a dispensing cycle. In an embodiment, the end cap 230 may be configured to rotate such that the end cap aperture 232 is in an "open" position at the start of a dispensing cycle, and to rotate such that the end cap aperture 232 is in a "closed" position at the end of a dispensing cycle.

Figure 3A:
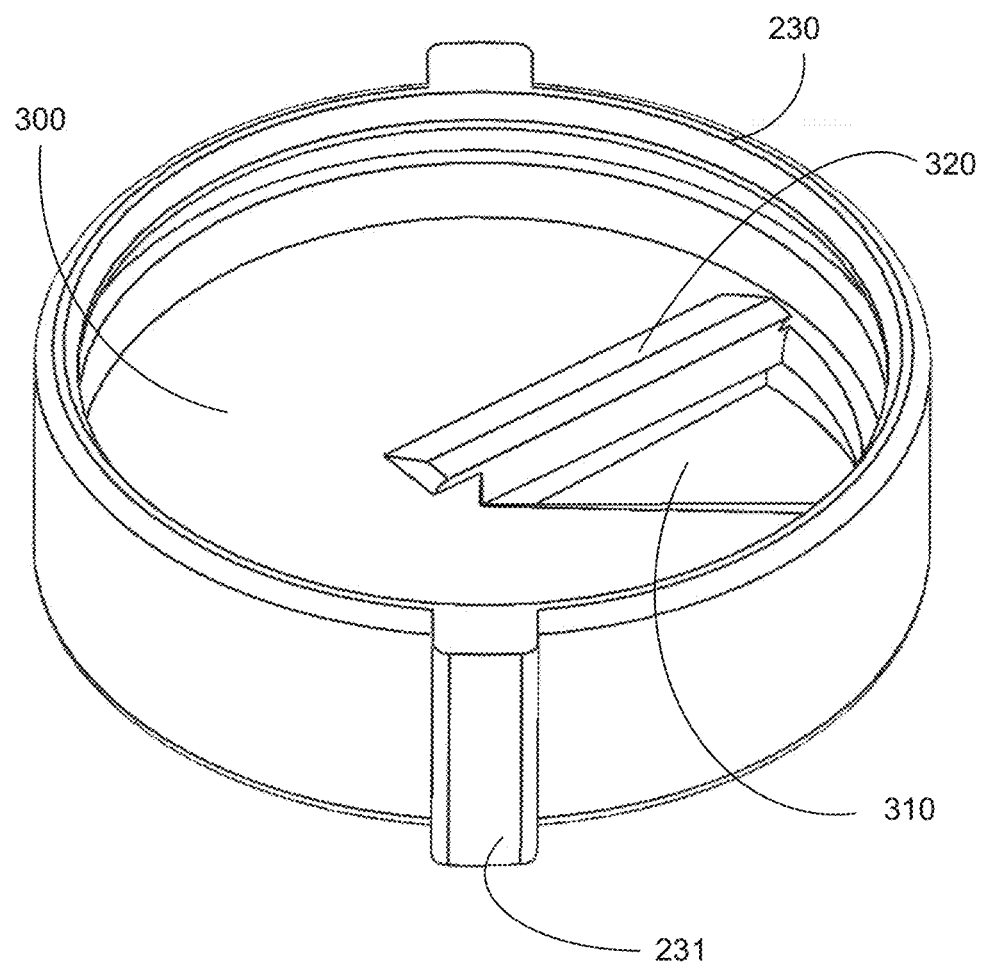
FIG. 3A is a top-isometric view of a dispensing element, placed inside a bottom cap of a capsule.

FIG. 3A is a top-isometric view of a dispensing element 300, placed inside an end cap 230 of a capsule 130. In an example embodiment, the dispensing element 300 is configured to dispense disperse solids such as, without limitation, powders, seeds, granules, and the like. In one embodiment, the dispensing element 300 is a disk, including first and second faces, an aperture 310 extending through the dispensing element, through which dispensed material may pass, and a scraping blade 320 extending from the first face of the dispensing element. In the example embodiment, the dispensing element 300 is disposed within the capsule's 130 end cap 230, such that the first face, and the extending scraping blade 320, contact the material in the capsule 130 from below. In the exemplary embodiment, the scraping blade 320 is configured to separate material upon rotation of the capsule 130. In the exemplary embodiment, wherein a pusher 220 compacts the material into a single bulk, collected at the end of the capsule 130 nearest the end cap 230, the rotation of the capsule 130 forces the co-rotating material against the scraping blade 320, causing the scraping blade 320 to knock loose a controlled amount of material per unit of motor activity.

In an embodiment, the dispensing element 300 may be configured to dispense material other than disperse solids, including materials such as, without limitation, liquids, vapors, and the like. In an embodiment, the dispensing element 300 may be configured to include a grinder, or the like, to standardize the consistency a material prior to dispensation.

Figure 3B:
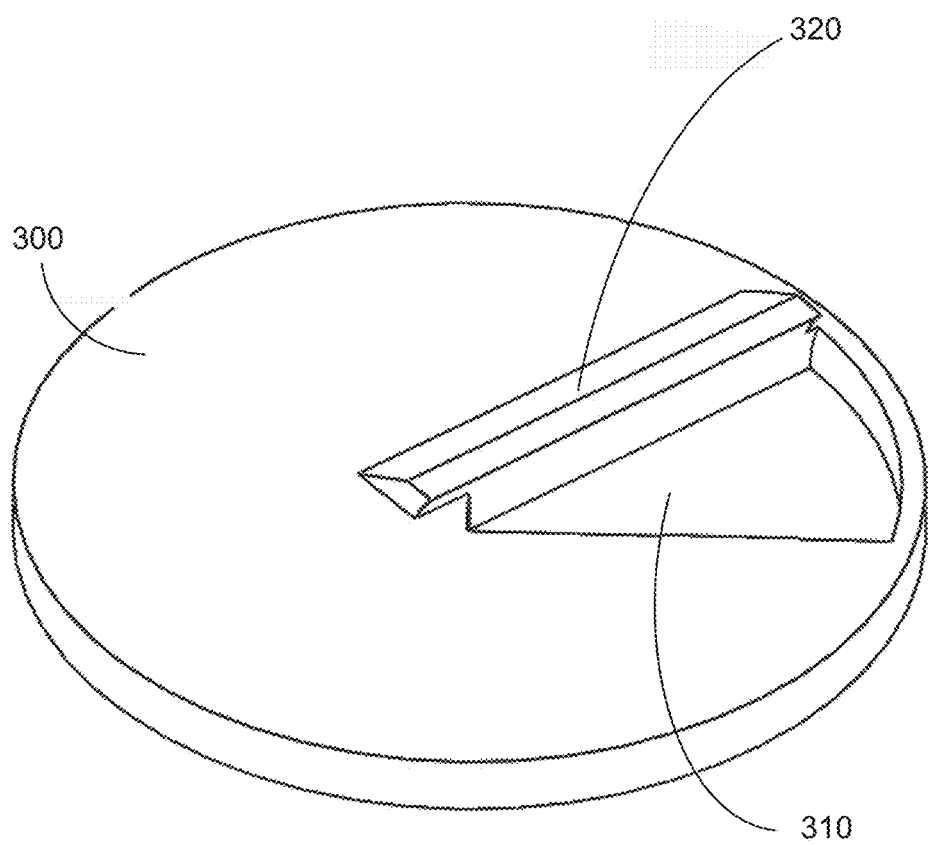
FIG. 3B is a forward-isometric view of the dispensing element according to an embodiment.

FIG. 3B is a forward-isometric view of a dispensing element 300 according to an embodiment. In the example embodiment, the dispensing element 300 is depicted without a supporting end cap 230, capsule 130, or other structure. As depicted in FIG. 3A, the first face of the dispensing element 300, and the extending scraping blade 320, are depicted. In the example embodiment, as described, the rotation of the capsule 130, and subsequent engagement of the material with the scraping blade 320, causes the dispensed material to separate from the bulk. In the example embodiment, the aperture 310 forms a passageway, allowing dispensed material to exit the capsule 130.

Figure 3C:
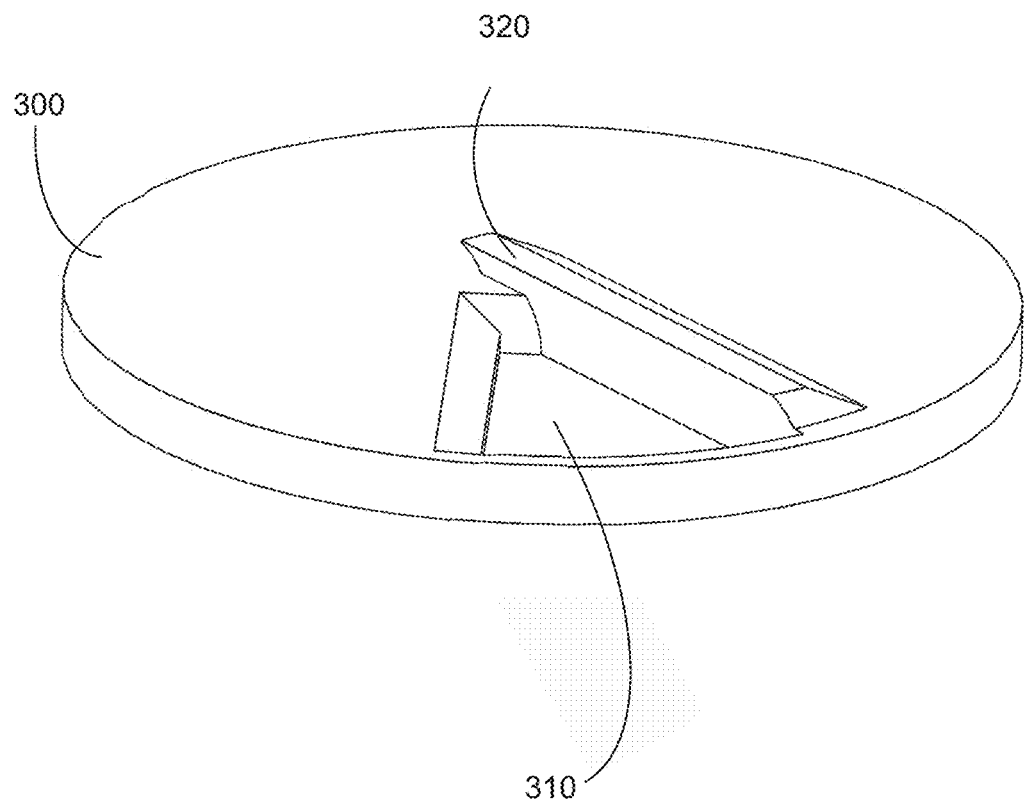
FIG. 3C is a right-isometric view of the dispensing element.

FIG. 3C is a right-isometric view of the dispensing element 300. In the example embodiment, the dispensing element 300 is depicted without a supporting end cap 230, capsule 130, or other structure. In the example embodiment, the aperture 310, the first face of the dispensing element 300, and the extending scraping blade 320, are depicted.

Figure 4A:
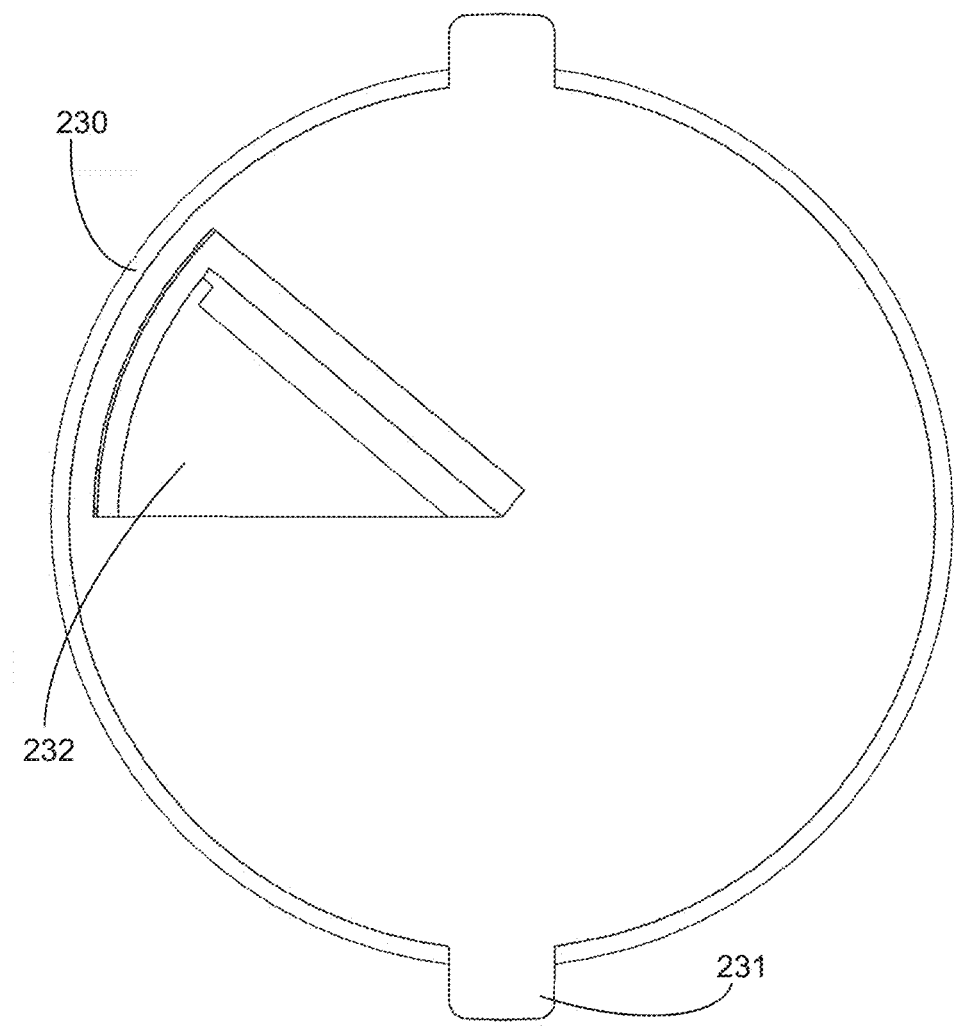
FIG. 4A is a bottom view of a capsule end cap in its open state.

FIG. 4A is a bottom view of a capsule end cap 230 in its open state. In an example embodiment, the capsule end cap 230, disposed at the end of a capsule 130 opposite the locking hub 140, includes an aperture 232 extending through the body of the end cap 230 and creating a passageway through which material may pass. The capsule end cap 230 may be freely rotatable relative to the capsule 130 and the dispensing element 300, allowing the aperture 232 to be opened at the beginning of a dispensing sequence and closed at the end of the dispensing sequence.

In the example embodiment, the aperture 232 is in an open state, through which all dispensed material may pass, determined by the complete alignment of the end cap aperture 232 with the dispensing element aperture 310.

Figure 4B:
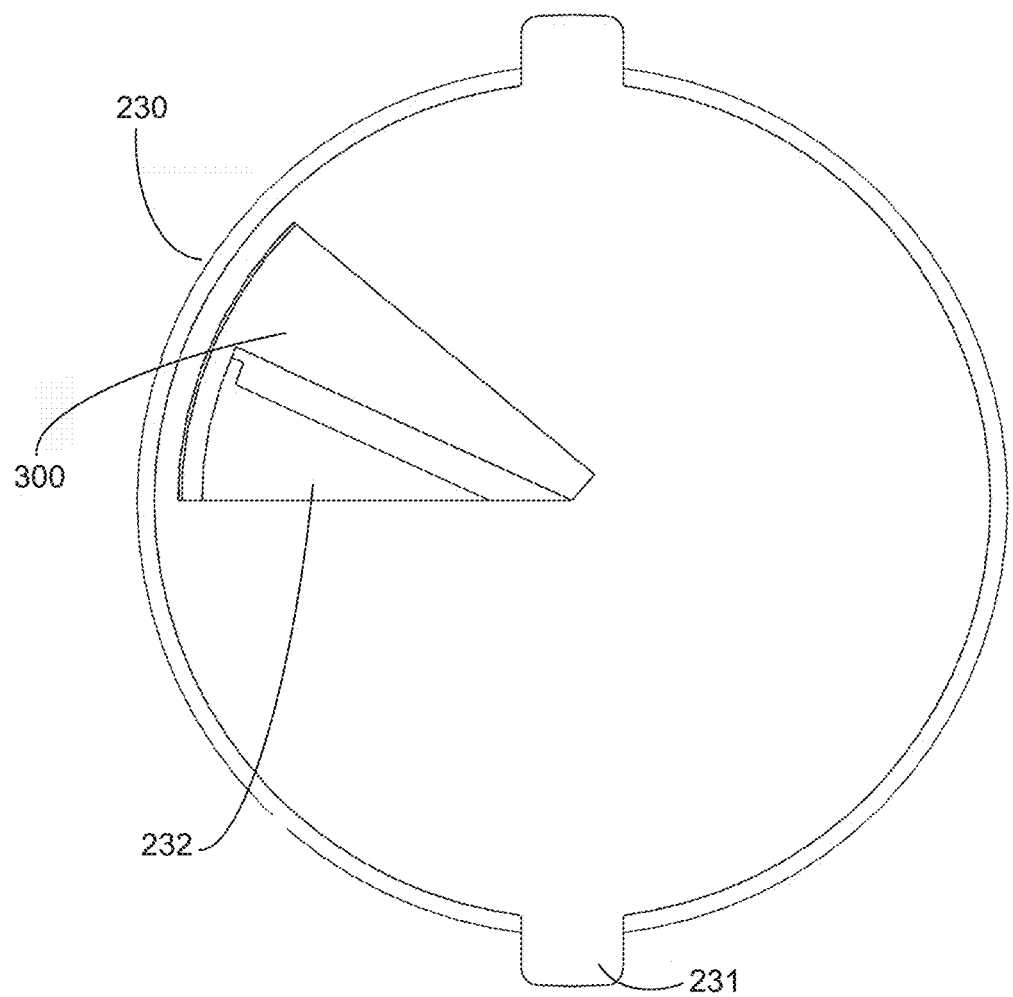
FIG. 4B is a bottom view of a capsule end cap in its semi-open state.

FIG. 4B is a bottom view of the capsule end cap 230 in its semi-open state. In the example embodiment, the capsule end cap 230, disposed at the end of a capsule 130 opposite the locking hub 140, includes an aperture 232 extending through the body of the end cap 230 and creating a passageway through which material may pass. The aperture 232 may be in a semi-open state, through which some dispensed material may pass, determined by the partial alignment of the end cap 230 aperture 232 with the dispensing element aperture 310.

Figure 4C:
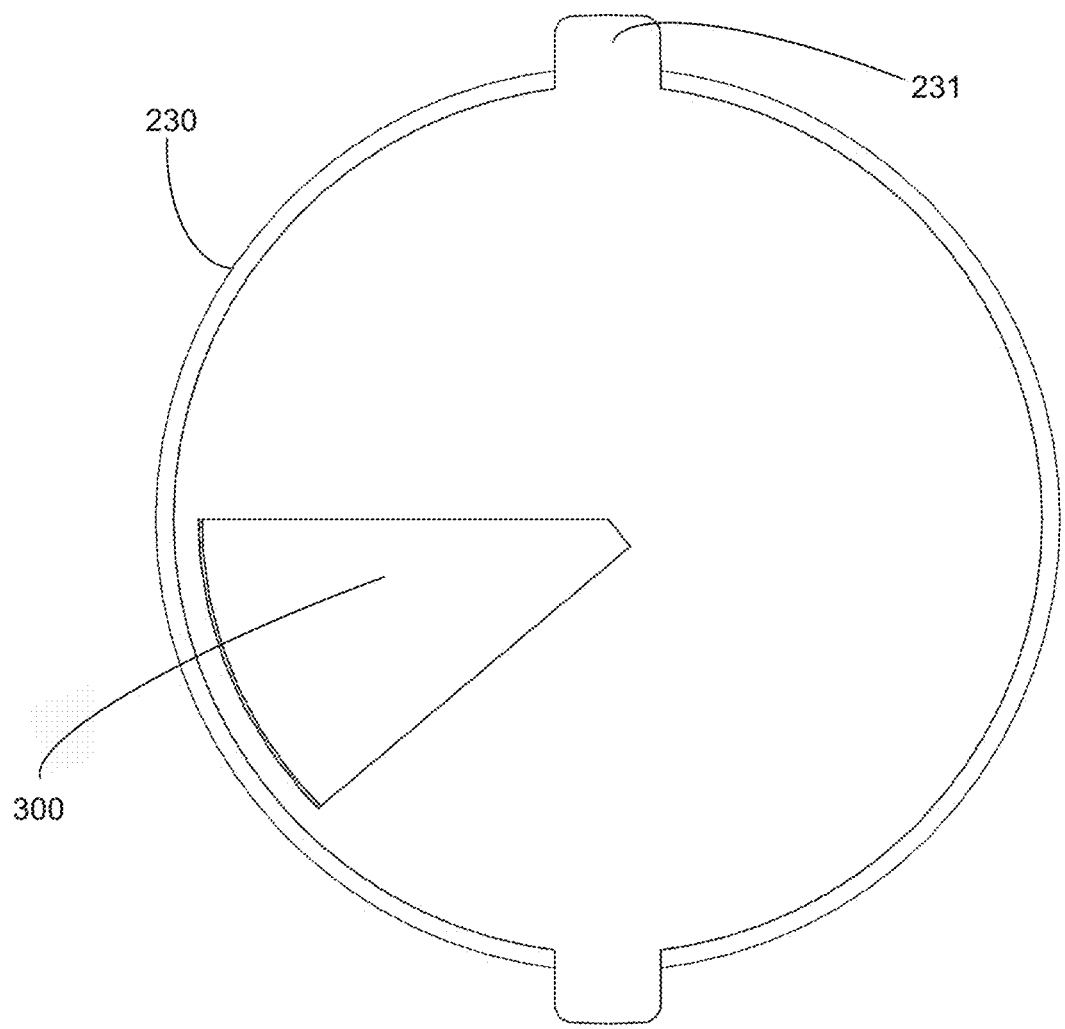
FIG. 4C is a bottom view of a capsule end cap in its closed state.

FIG. 4C is a bottom view of the capsule end cap 230 in its closed state. In the example embodiment, the capsule end cap 230, disposed at the end of a capsule 130 opposite the locking hub 140, includes an aperture 232 extending through the body of the end cap 230 and creating a passageway through which material may pass. In an embodiment, the capsule end cap 230 is freely rotatable relative to the capsule 130 and the dispensing element 300, allowing the aperture 232 to be opened at the beginning of the dispensing sequence and closed at the end of the dispensing sequence.

In the example embodiment, the aperture 232 is in a closed state, through which no dispensed material may pass, determined by the total non-alignment of the end cap aperture 232 with the dispensing element aperture 310.

In an embodiment, the capsule end cap 230 may include orientation tabs 231. In an embodiment, the orientation tabs 231 may be aligned with corresponding apertures in the capsule magazine 120 to achieve a secure and stable placement of the capsule 130 within the capsule magazine 120 and to hold the end cap 230 from rotating, while rotating the capsule.

Figure 5A:
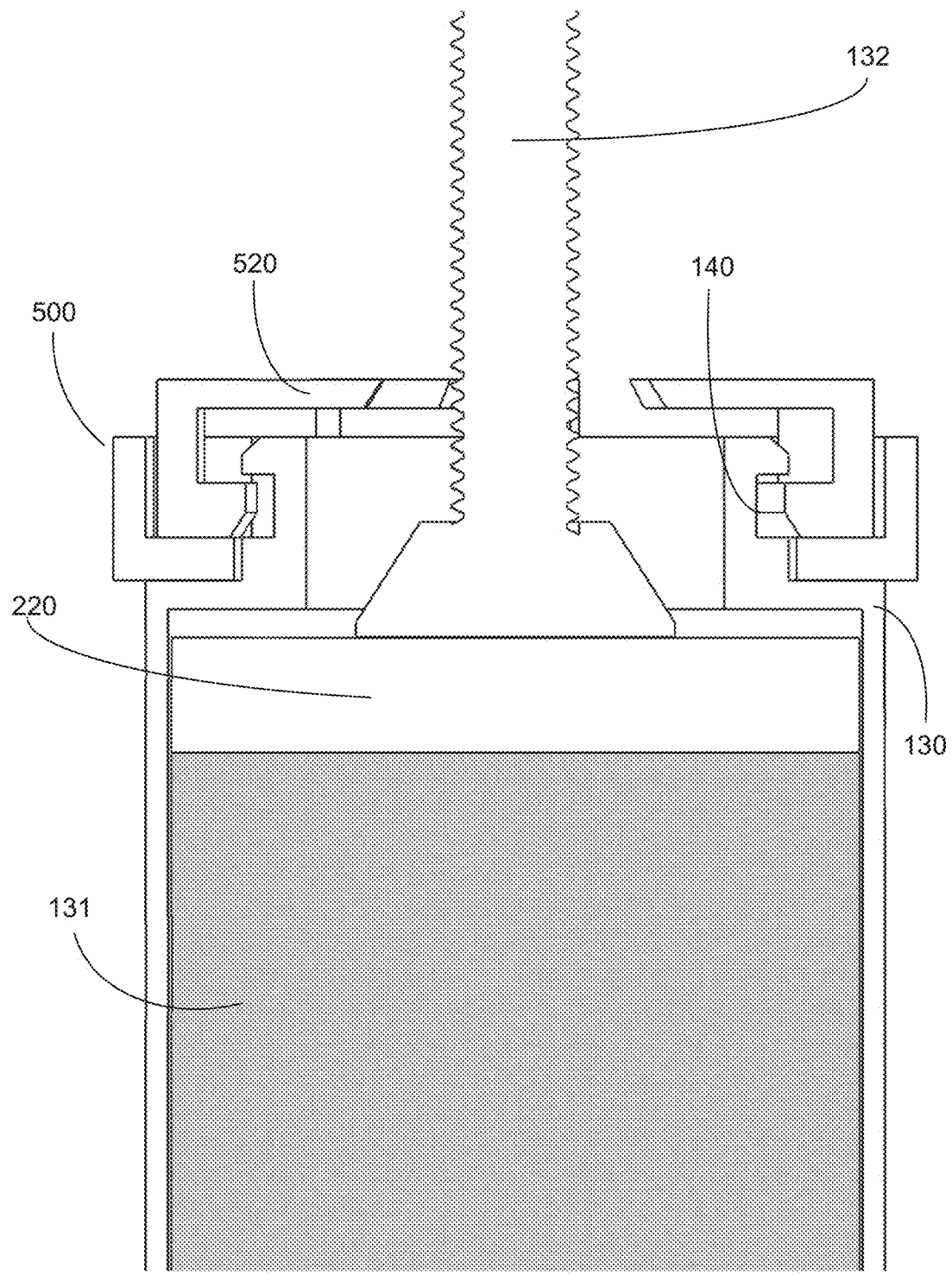
FIG. 5A is a forward cross-section of a mechanism locking the capsule to the dispensing device according to an embodiment.

FIG. 5A is a forward cross-section of a mechanism 500 locking the capsule to the dispensing device, according to an embodiment. In an example embodiment, the capsule locking mechanism 500 includes a capsule 130, including a locking hub 140 and a pusher 220, a pushing element 132, and a locking ring 520. In the example embodiment, the locking ring 520 is connected to the locking hub via the locking hub's groove 141.

Figure 5B:
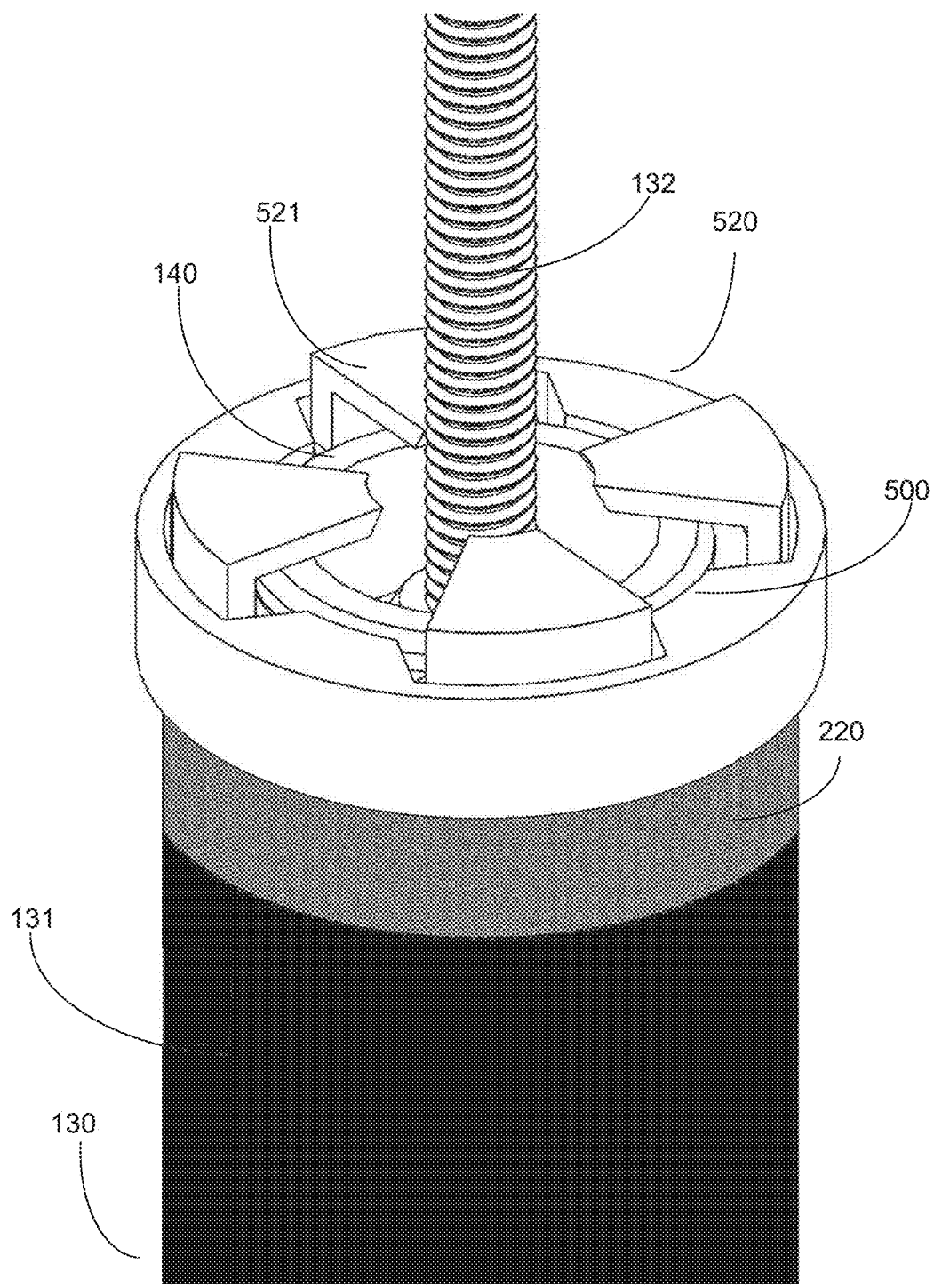
FIG. 5B is a forward-isometric view of the mechanism locking the capsule to the dispensing device according to an embodiment.

FIG. 5B is a forward-isometric view of the mechanism 500 locking the capsule 130 to the dispensing device 100, according to an embodiment. In an example embodiment, the capsule locking mechanism 500 includes a capsule 130, including a locking hub 140 and a pusher 220, and a locking ring 520. In the example embodiment, the locking ring 520 is connected to the locking hub via the locking hub's groove 141 and provides a plurality of locking tabs 521, to which locking appendages may attach. In the example embodiment, the locking ring 520, attached to the capsule 130, includes a plurality of locking tabs 521 which may engage with locking appendages included in the dispensing device head 110 to provide a stable, secure connection between the capsule 130 and the dispensing device head 110 and to transfer a rotation movement from the motor to the capsule.

Figure 6A:
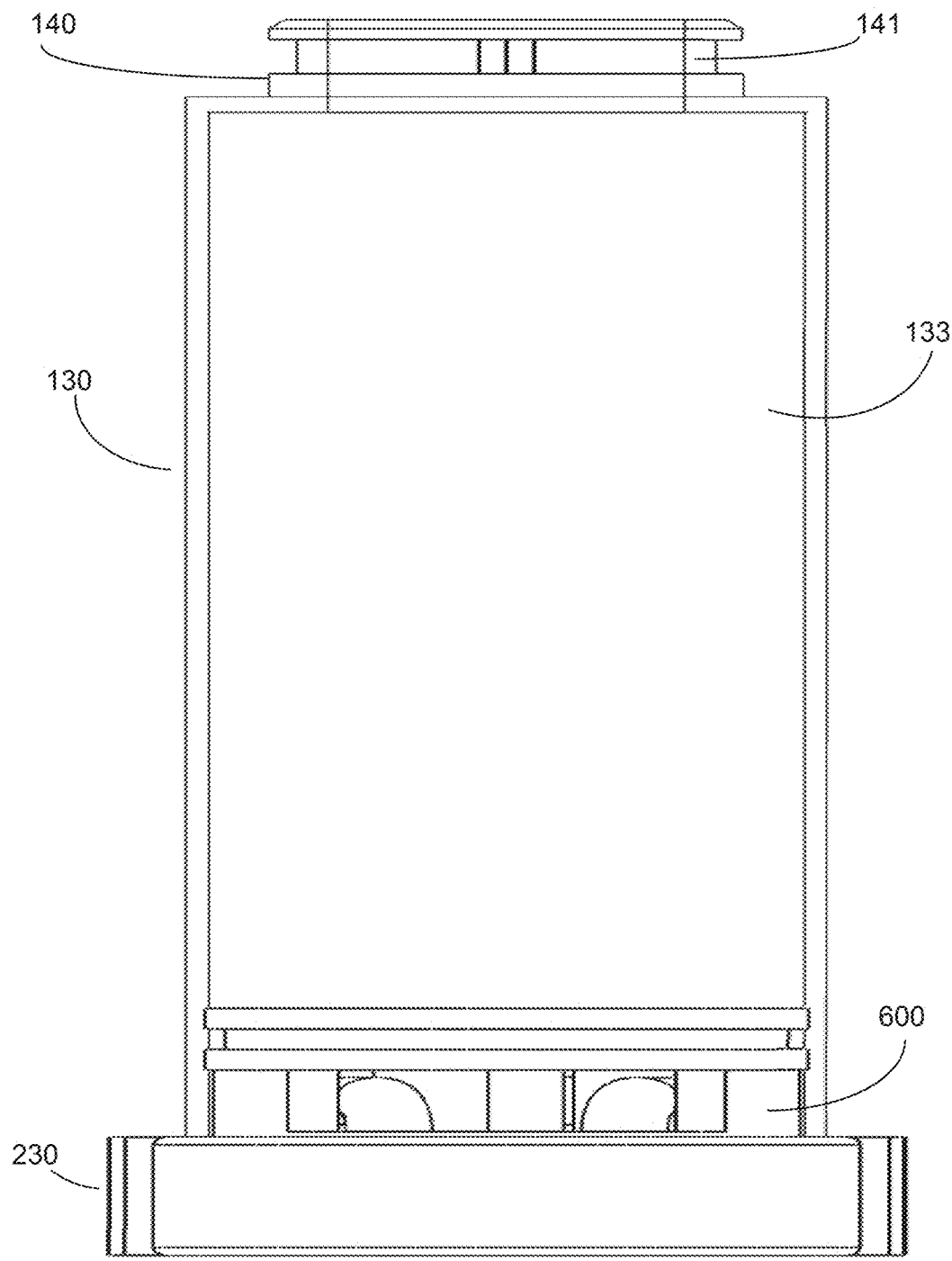
FIG. 6A is a forward view of a capsule with a pump head, for pouring liquids according to an embodiment.

FIG. 6A is a forward view of a capsule 130 with a pump head 600, for pouring liquids, according to an embodiment. The capsule includes an end cap 230, a pump head 600, and a capsule body 133. In the example embodiment, the pump head 600 may be rotatable relative to the capsule body 133, such that rotation of the capsule body 133 activates the mechanism of the pump head 600, allowing a user to dispense a defined amount of liquid per unit of motor action.

Figure 6B:
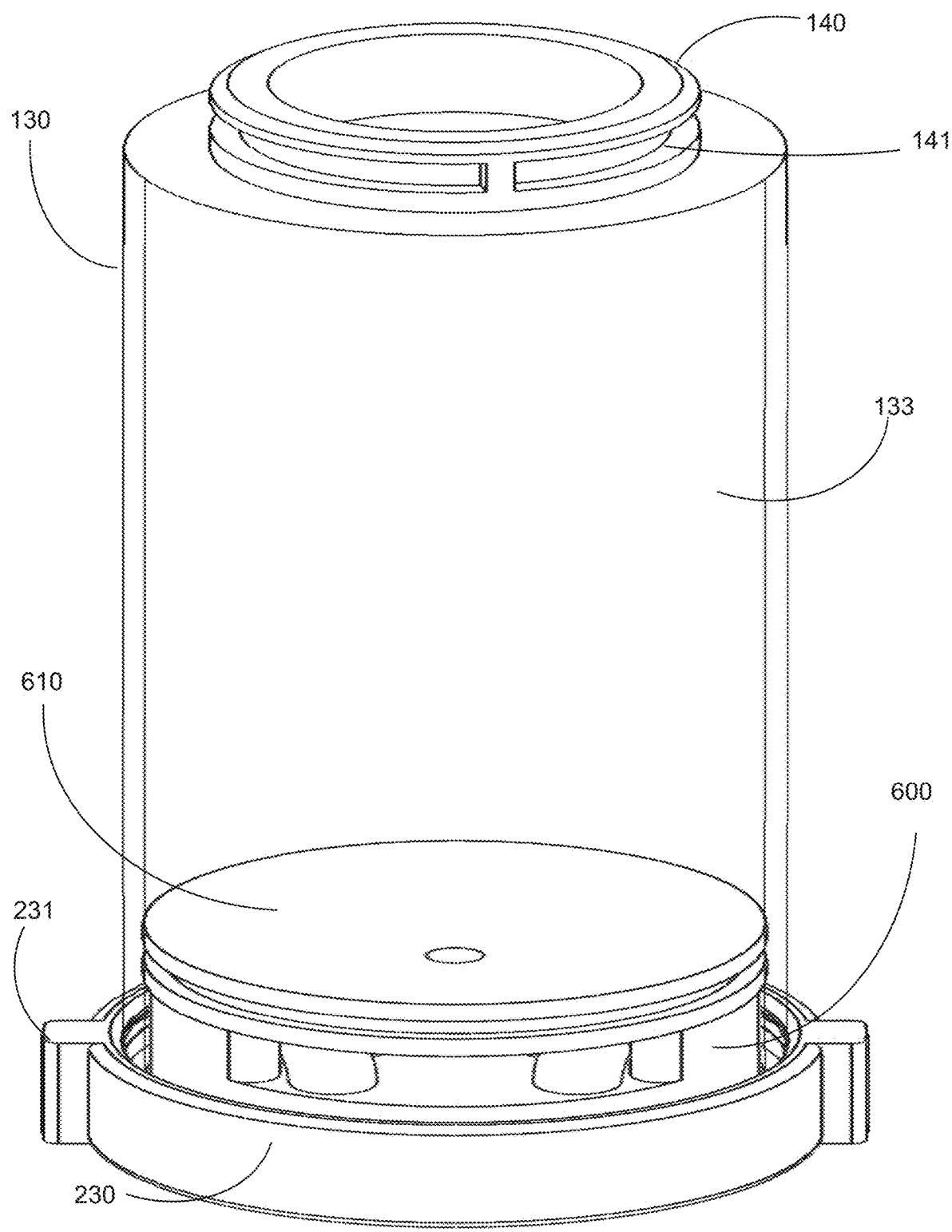
FIG. 6B is a forward-isometric view of a capsule with a pump head, for pouring liquids according to an embodiment.

FIG. 6B is a forward-isometric view of a capsule 130 with a pump head 600, for pouring liquids, according to an embodiment. The capsule 130 includes an end cap 230, a pump head 600, and a capsule body 133. In the example embodiment, the pump head 600 may be rotatable relative to the capsule body 133, such that rotation of the capsule body 133 activates the mechanism of the pump head 600, allowing a user to dispense a defined amount of liquid per unit of motor action. In the example depiction, the orientation tabs 231, which the end cap 230 includes, are shown.

Figure 6C:
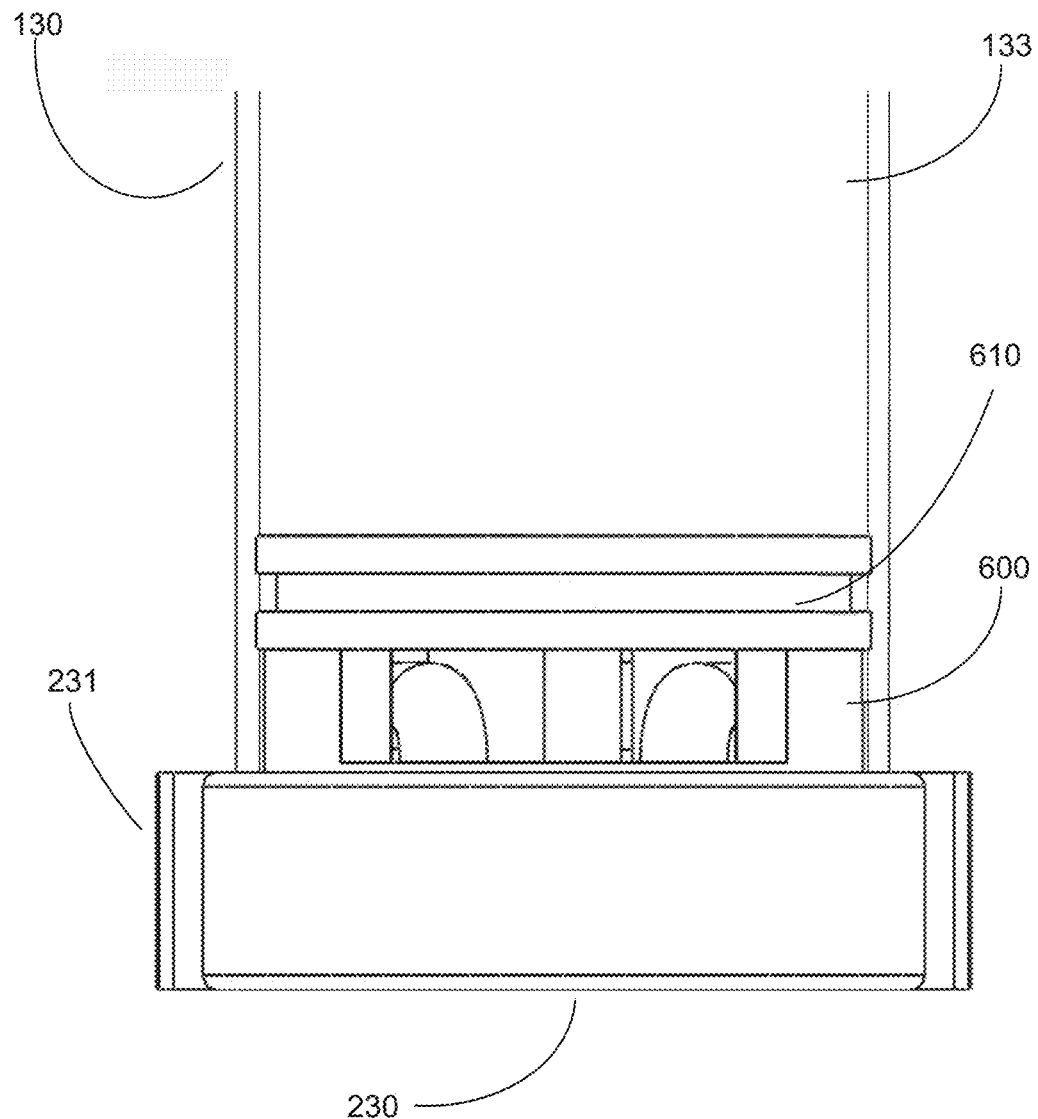
FIG. 6C is a forward detail view of a capsule with a pump head, for pouring liquids according to an embodiment.

FIG. 6C is a forward detail view of a capsule 130 with a pump head 600, for pouring liquids, according to an embodiment. In the example embodiment, the capsule 130 includes an end cap 230, a pump head 600, and a capsule body 133. In the example embodiment, the pump head 600 may be rotatable relative to the capsule body 133, such that rotation of the capsule body 133 activates the mechanism of the pump head 600, allowing a user to dispense a defined amount of liquid per unit of motor action. In the example depiction, the pump head's sink 610, pump body 620, and flexible barrier 630 are visible.

Figure 6D:
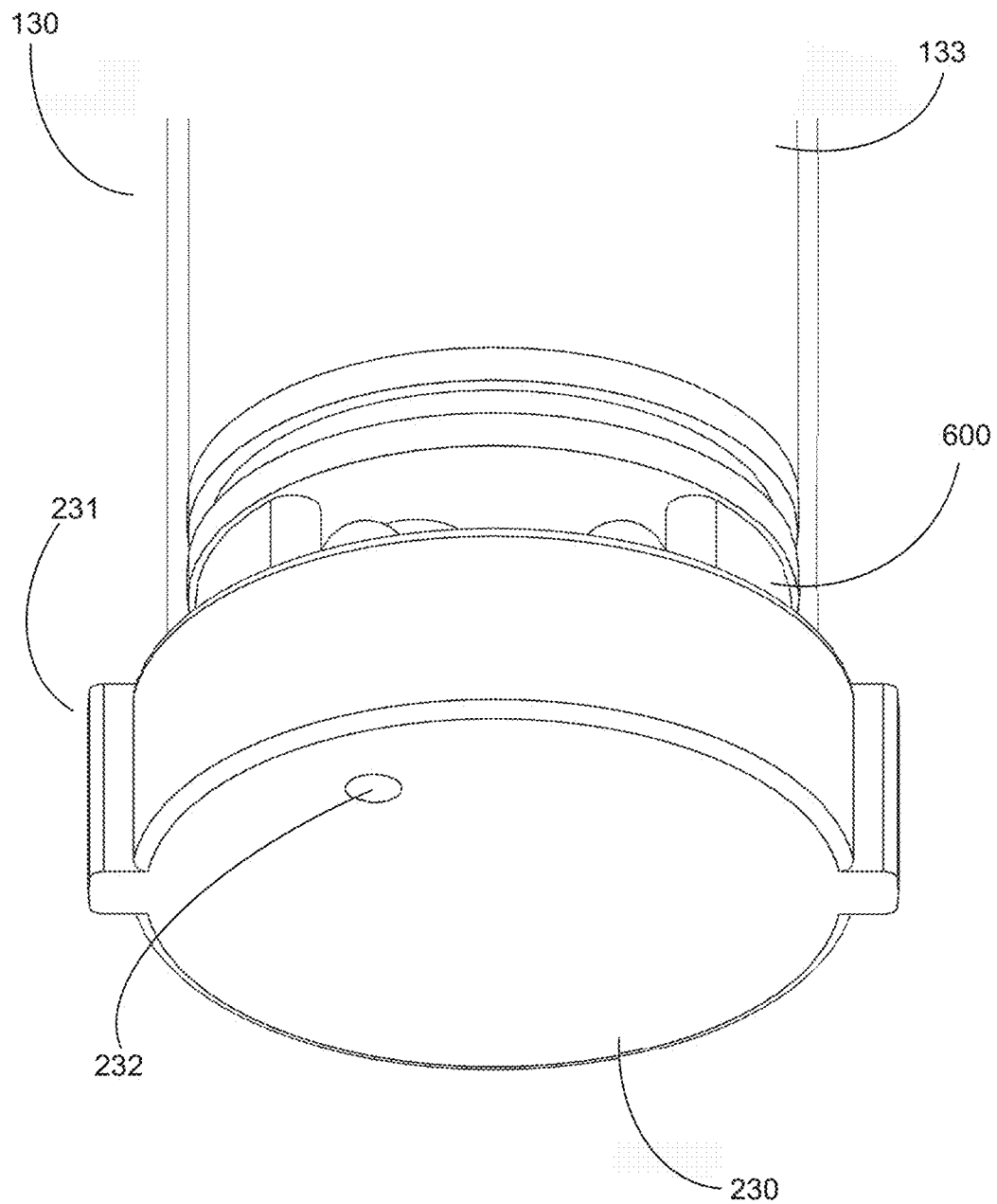
FIG. 6D is a bottom-isometric detail view of a capsule with a pump head, for pouring liquids according to an embodiment.

FIG. 6D is a bottom-isometric detail view of a capsule 130 with a pump head 600, for pouring liquids, according to an embodiment. The capsule 130 may include an end cap 230, a pump head 600, and a capsule body 133. In the example embodiment, the pump head 600 may be rotatable relative to the capsule body 133, such that rotation of the capsule body 133 activates the mechanism of the pump head 600, allowing a user to dispense a defined amount of liquid per unit of motor action. In the example depiction, the aperture 232 and orientation tabs 231 included in the end cap 230 are visible.

Figure 6E:
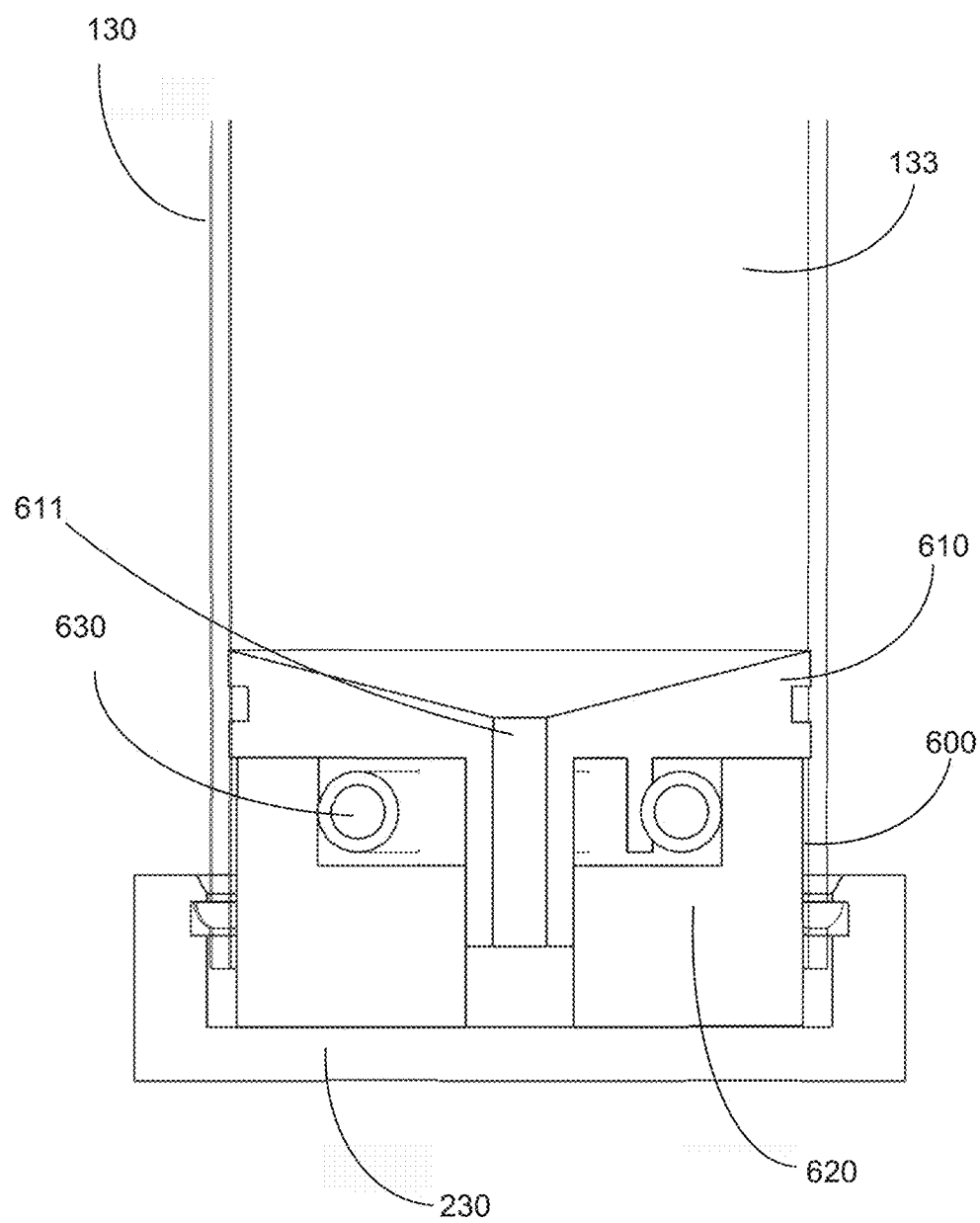
FIG. 6E is a forward cross-section detail view, indicating internal components, of a capsule with a pump head, for pouring liquids according to an embodiment.

FIG. 6E is a forward cross-section detail view, indicating internal components, of a capsule 130 with a pump head 600, for pouring liquids, according to an embodiment. In the example depiction, the capsule body 133, end cap 230, and pump head 600, including a sink 610, disposed in contact with the contents of the capsule 131 and having a central channel 611 through which fluid may pass, a pump body 620, having an inlet channel 621 co-axial to, and in fluid communication with, the sink's central channel 611, and a flexible barrier 630, disposed between the pump body 620 and the sink 610 and forming an arc centered around the sink's central channel 611, are visible.

In an embodiment, liquid from the capsule body 133 flows through the sink's central channel 611 into the pump body 620. In the exemplary embodiment, the flexible barrier 630 creates a fluid connection between the pump body 620 and a dispensing aperture 640. In the exemplary embodiment, rotation of the capsule 130 causes rotation of the sink 610 relative to the pump body 620 and flexible barrier 630. In the example embodiment, rotation of the sink 610 relative to the pump body 620 causes at least one wheel 650, disposed between the sink 610 and the flexible barrier 630, to roll along a path defined by the flexible barrier 630.

In an example embodiment, the motion of the at least one wheel 650 causes the flexible barrier 630 to compress at the point of contact between the flexible barrier 630 and the at least one wheel 650, creating at least one open fluid pocket. The motion of the at least one wheel 650 pushes the at least one open fluid pocket along the length of the flexible barrier 630, allowing the liquid within the open fluid pocket to reach the dispensing aperture 640. In the example embodiment, the motion of individual open fluid pockets with the rotation of the capsule 130 allows the dispensation of controlled amounts of liquid per unit of motor action, allowing the user to control liquid dispensation using the trigger 111.

In an embodiment, the pump head includes at least two wheels 650. In such an embodiment, the motion of the at least two wheels 650 causes the flexible barrier 630 to compress at the point of contact between the flexible barrier 630 and the at least two wheels 650, creating at least one sealed fluid pocket. The motion of the at least two wheels 650 pushes the at least one sealed fluid pocket along the length of the flexible barrier 630, allowing the liquid within the at least one sealed fluid pocket to reach the dispensing aperture 640. In the example embodiment, the motion of individual sealed fluid pockets with the rotation of the capsule 130 allows the dispensation of controlled amounts of liquid per unit of motor action, allowing the user to control liquid dispensation using the trigger 111.

In an embodiment, the capsule 130 may include a pusher 220 which provides constant pressure on the liquid contained in the capsule 130. In such an embodiment, the pressure added by the pusher 220 ensures constant fluid flow between the capsule 130 and the flexible barrier 630, through the sink 610 and the pump body 620.

In an embodiment, the capsule 130 may include a pusher 220 which serves as a seal for the material 131 contained in the capsule. In such an embodiment, the material contained within the capsule 130 may be a liquid, and the pusher 220 may be configured to move with the dispensation of liquid from the pump head 600. In such an embodiment, the pressure differential created by the dispensation of the liquid may be sufficient to move the pusher 220 to the meniscus, forming a seal between outside contaminants and the liquid in the capsule 130.

Figure 6F:
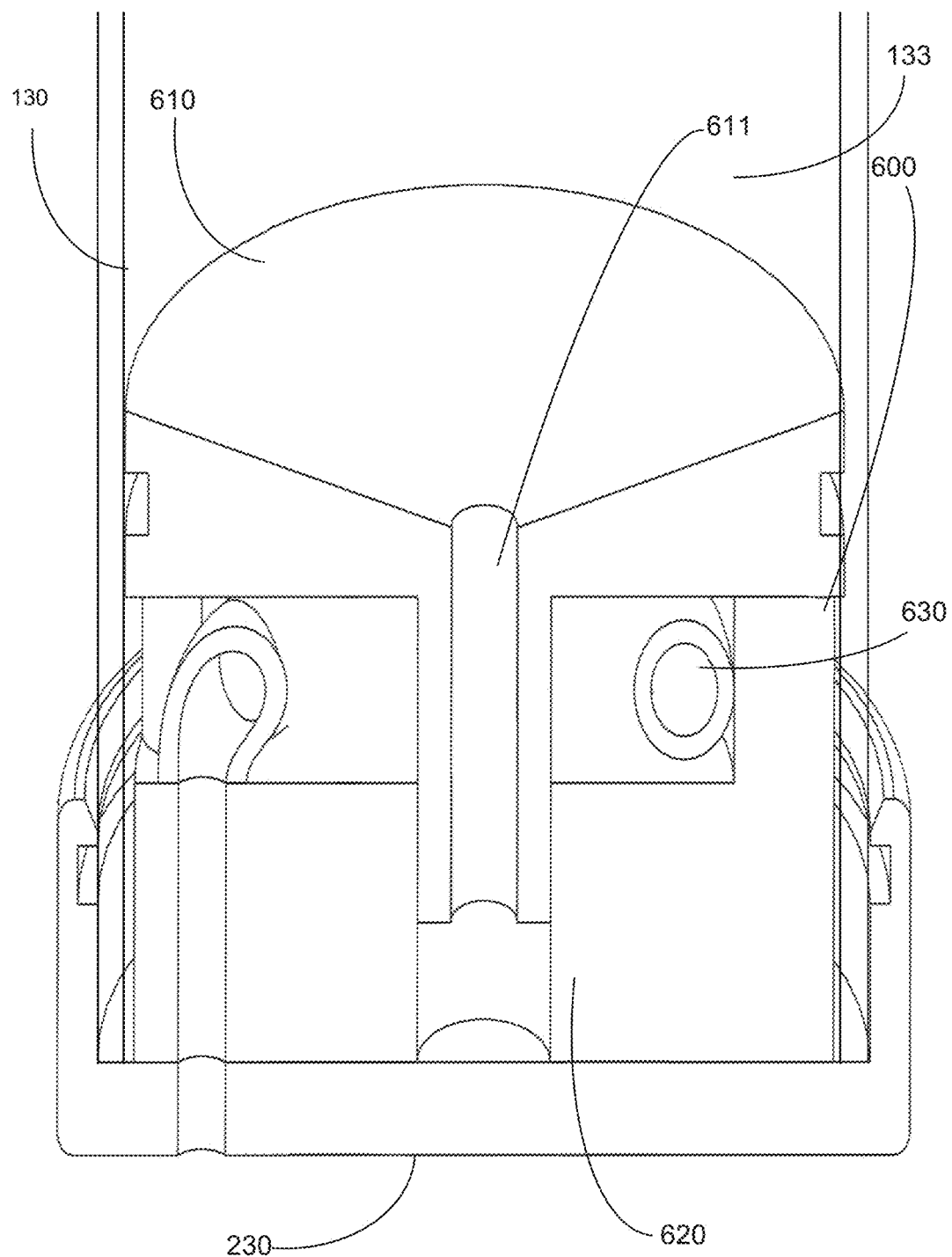
FIG. 6F is a forward-isometric cross-section detail view, indicating internal components, of a capsule with a pump head, for pouring liquids according to an embodiment.

FIG. 6F is a forward-isometric cross-section detail view, indicating internal components, of a capsule 130 with a pump head 600, for pouring liquids, according to an embodiment. In the example depiction, the capsule body 133, end cap 230, and pump head 600, including a sink 610, disposed in contact with the contents of the capsule 131 and having a central channel 611 through which fluid may pass, a pump body 620, and a flexible barrier 630, disposed between the pump body 620 and the sink 610 and forming an arc centered around the sink's central channel 611, are visible. In the exemplary embodiment, liquid from the capsule body 133 flows through the sink's central channel 611 into the pump body 620.

Figure 6G:
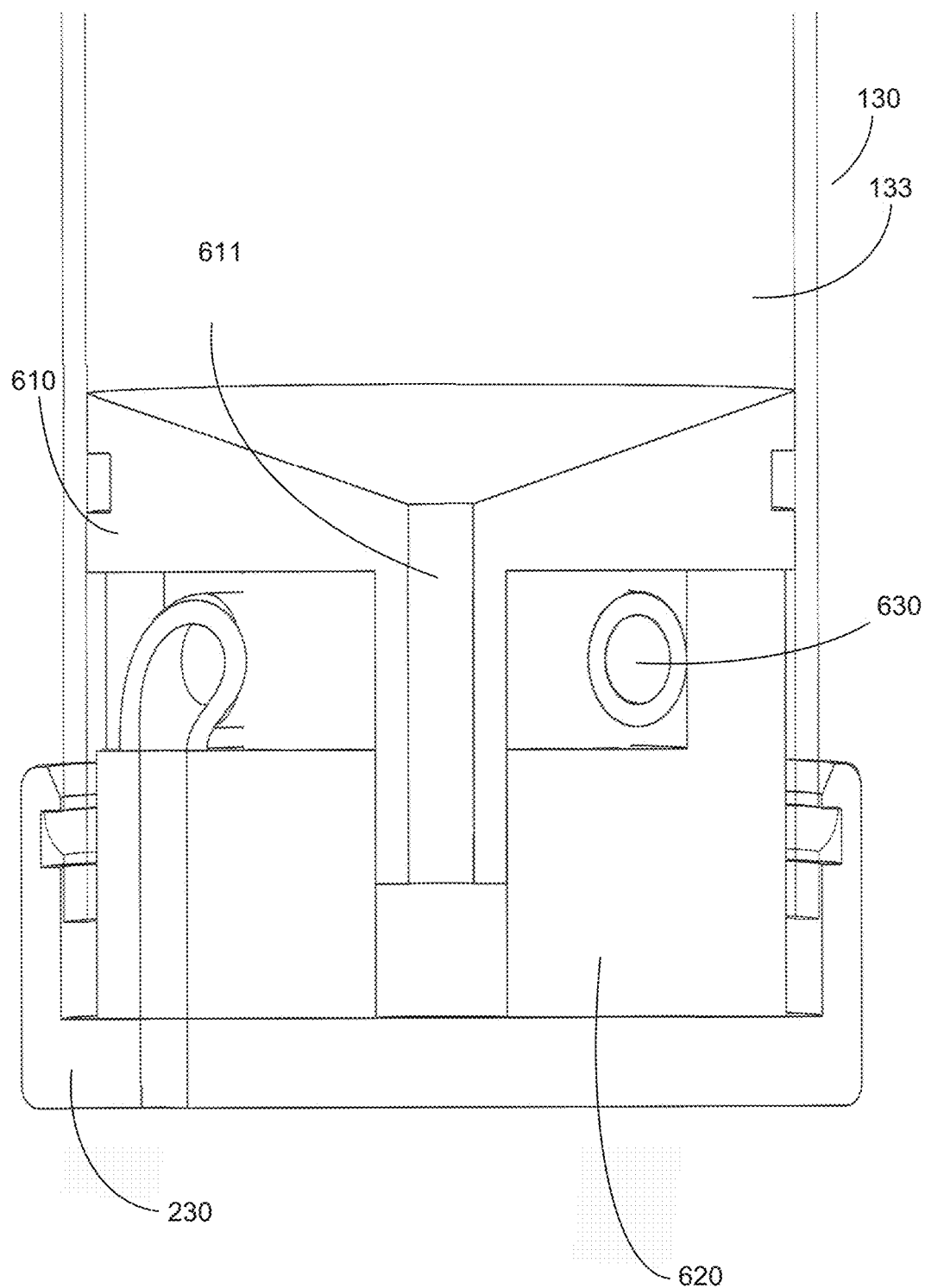
FIG. 6G is a forward cross-section detail view, indicating internal components, of a capsule with a pump head, for pouring liquids according to an embodiment.

FIG. 6G is a forward cross-section detail view, indicating internal components, of a capsule 130 with a pump head 600, for pouring liquids, according to an embodiment. In the example depiction, the capsule body 133, end cap 230, and pump head 600, including a sink 610, disposed in contact with the contents of the capsule 131 and having a central channel 611 through which fluid may pass, a pump body 620, and a flexible barrier 630, disposed between the pump body 620 and the sink 610 and forming an arc centered around the sink's central channel 611, are visible. In the exemplary embodiment, liquid from the capsule body 133 flows through the sink's central channel 611 into the pump body 620.

Figure 6H:
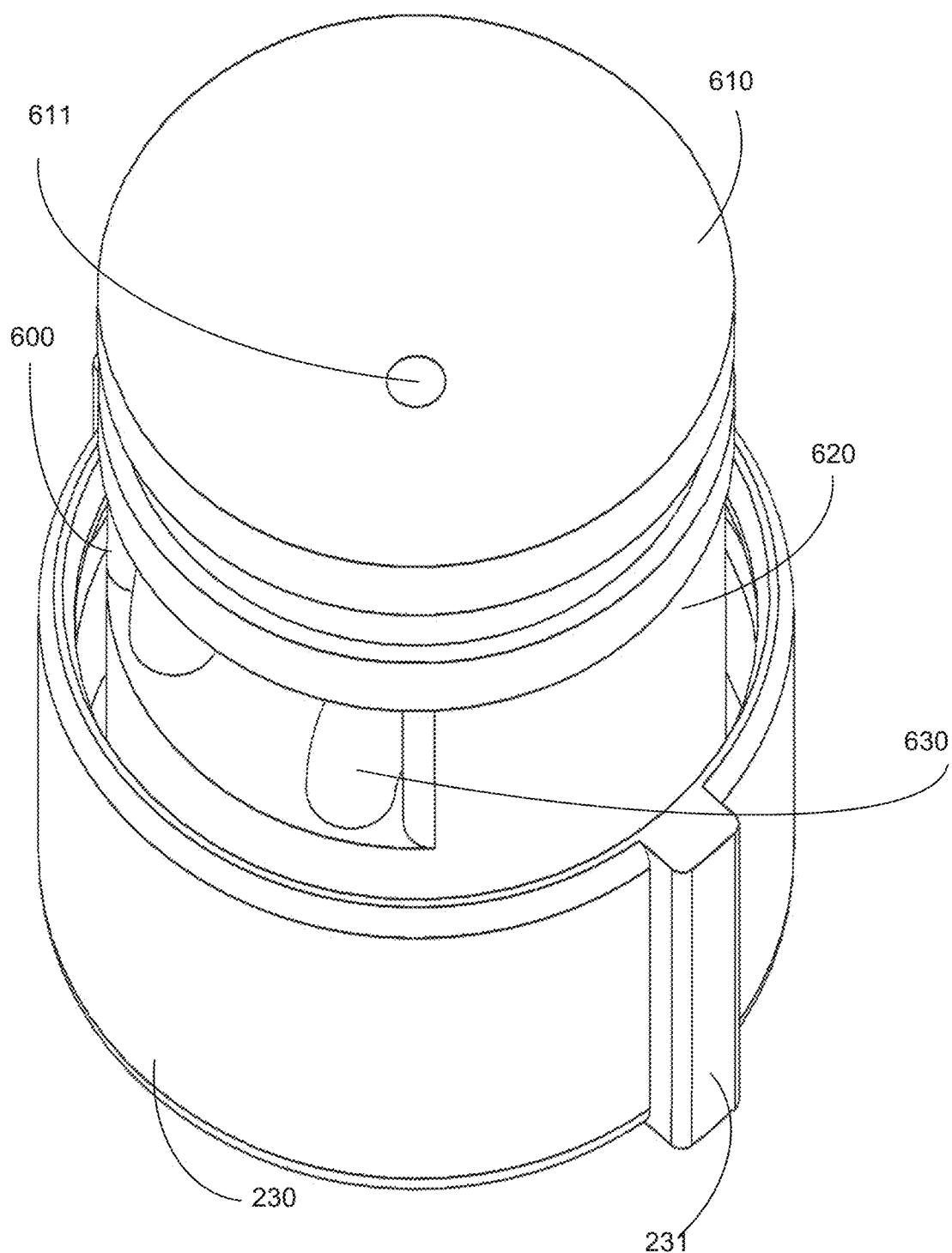
FIG. 6H is a right-isometric view of a pump head according to an embodiment.

FIG. 6H is a right-isometric view of a pump head 600, according to an embodiment. In the example depiction, the capsule end cap 230, the pump head 600, including a sink 610, disposed in contact with the contents of the capsule 131 and having a central channel 611 through which fluid may pass, a pump body 620, and a flexible barrier 630, disposed between the pump body 620 and the sink 610 and forming an arc centered around the sink's central channel 611, are visible. In the exemplary embodiment, liquid from the capsule body 133 flows through the sink's central channel 611 into the pump body 620.

Figure 6I:
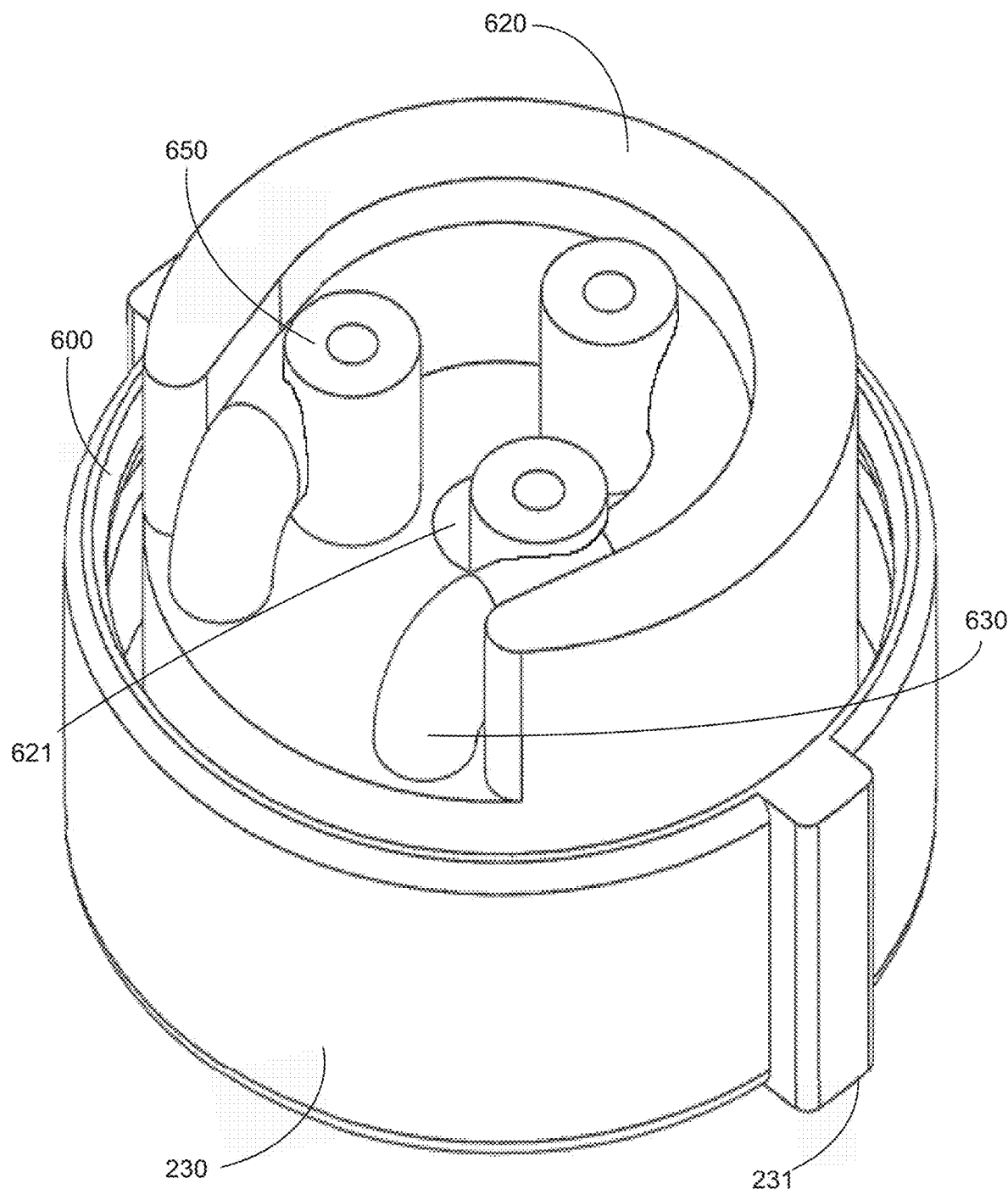
FIG. 6I is a right-isometric view of a pump head according to an embodiment.

FIG. 6I is a right-isometric view of a pump head 600, according to an embodiment. In the example depiction, the capsule end cap 230, the pump head 600, including a pump body 620, a flexible barrier 630, disposed in contact with the face of the pump body 620 opposite the capsule end cap 230 and forming an arc centered around the pump body's inlet channel 621, and a plurality of wheels 650, disposed in contact with the flexible barrier 630, are visible. In the exemplary embodiment, liquid from the capsule body 133 flows through the sink's central channel 611 into the pump body 620.

Figure 6J:
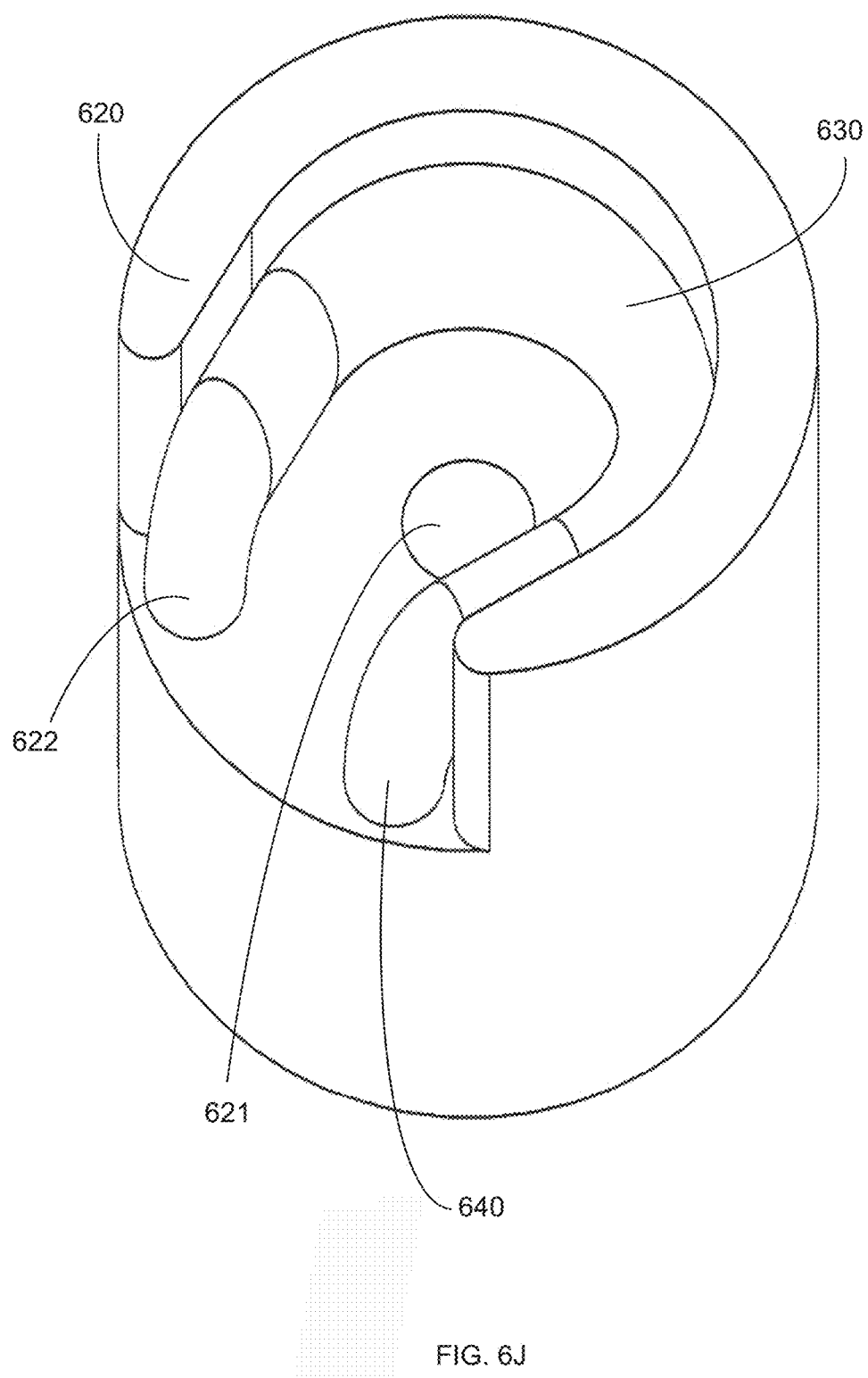
FIG. 6J is a right-isometric view of a pump head according to an embodiment.

FIG. 6J is a right-isometric view of a pump head 600, according to an embodiment. In the example depiction, the pump head 600, including a pump body 620 and a flexible barrier 630, disposed between the pump body 620 and the sink 610 and forming an arc centered around the pump body's inlet channel 621, is visible. In the exemplary embodiment, liquid from the capsule body 133 flows through the sink's central channel 611 into the pump body 620.

Figure 6K:
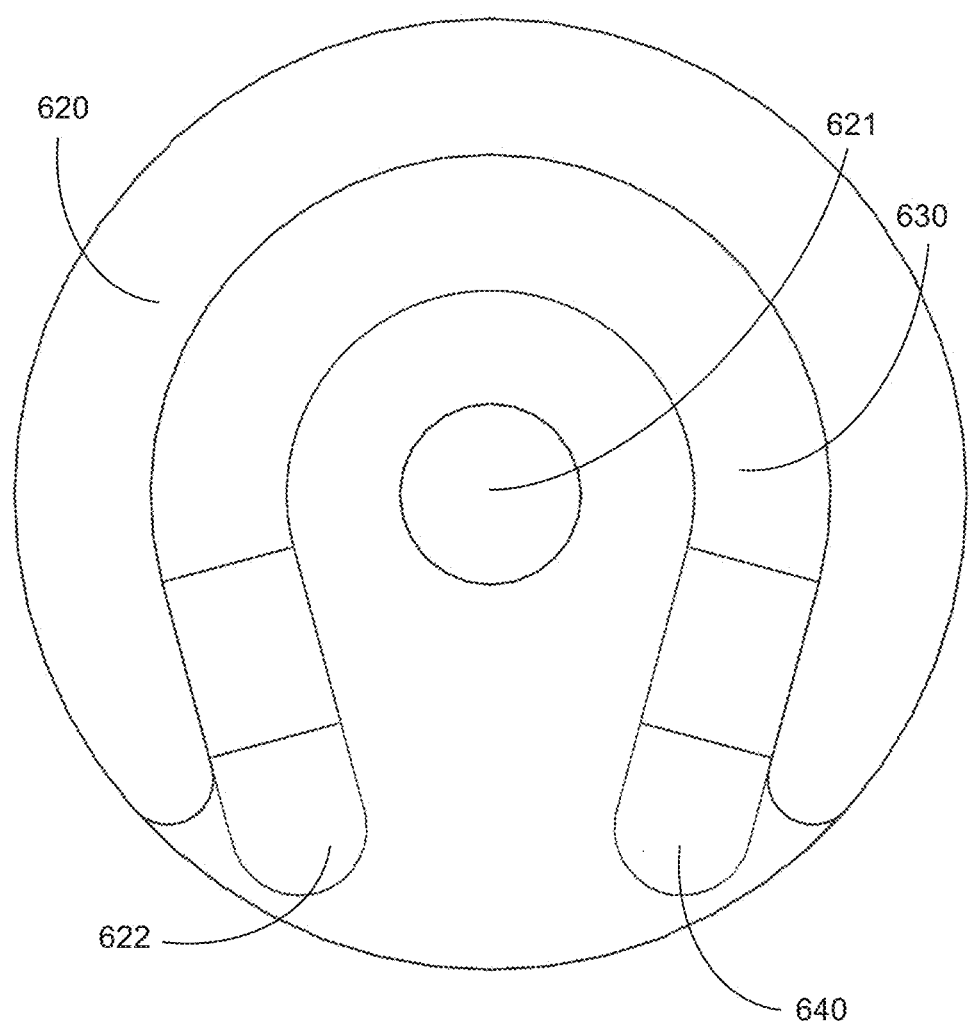
FIG. 6K is a top view of a pump head according to an embodiment.

FIG. 6K is a top view of a pump head 600, according to an embodiment. In the example depiction, the pump head 600, including a pump body 620 and a flexible barrier 630, disposed between the pump body 620 and the sink 610 and forming an arc centered around the pump body's inlet channel 621, is visible. In the exemplary embodiment, liquid from the capsule body 133 flows through the sink's central channel 611 into the pump body 620.

Figure 6L:
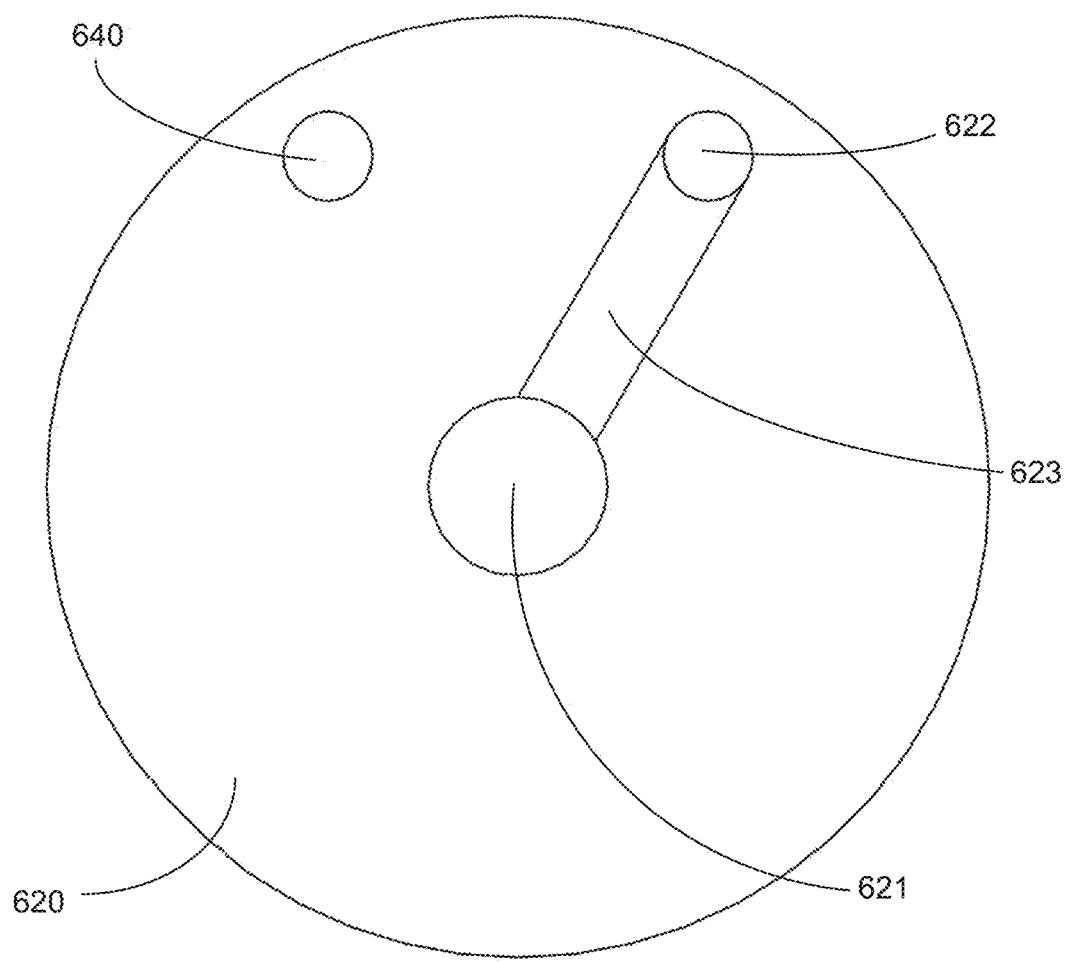
FIG. 6L is a bottom view of a pump head according to an embodiment.

FIG. 6L is a bottom view of a pump head 600, according to an embodiment. In FIG. 6L, some components are hidden to reveal internal features. In the example depiction, a pump body 620, including an inlet channel 621, an outlet channel 622, a bypass tunnel 623 linking the inlet 621 and outlet 622 channels, and a dispensing aperture 640, is visible. In the exemplary embodiment, liquid flows from the inlet channel 621 through the pump body 620 and into the outlet channel 622. In the exemplary embodiment, liquid flows from the pump body outlet channel 622 through the flexible barrier 630, as depicted previously, and to the dispensing aperture 640, where the liquid is dispensed. In an embodiment, the capsule 130 may include a pusher 220 which provides pressure, causing the liquid in the capsule 130 to flow as described without interruption.

Figure 6M:
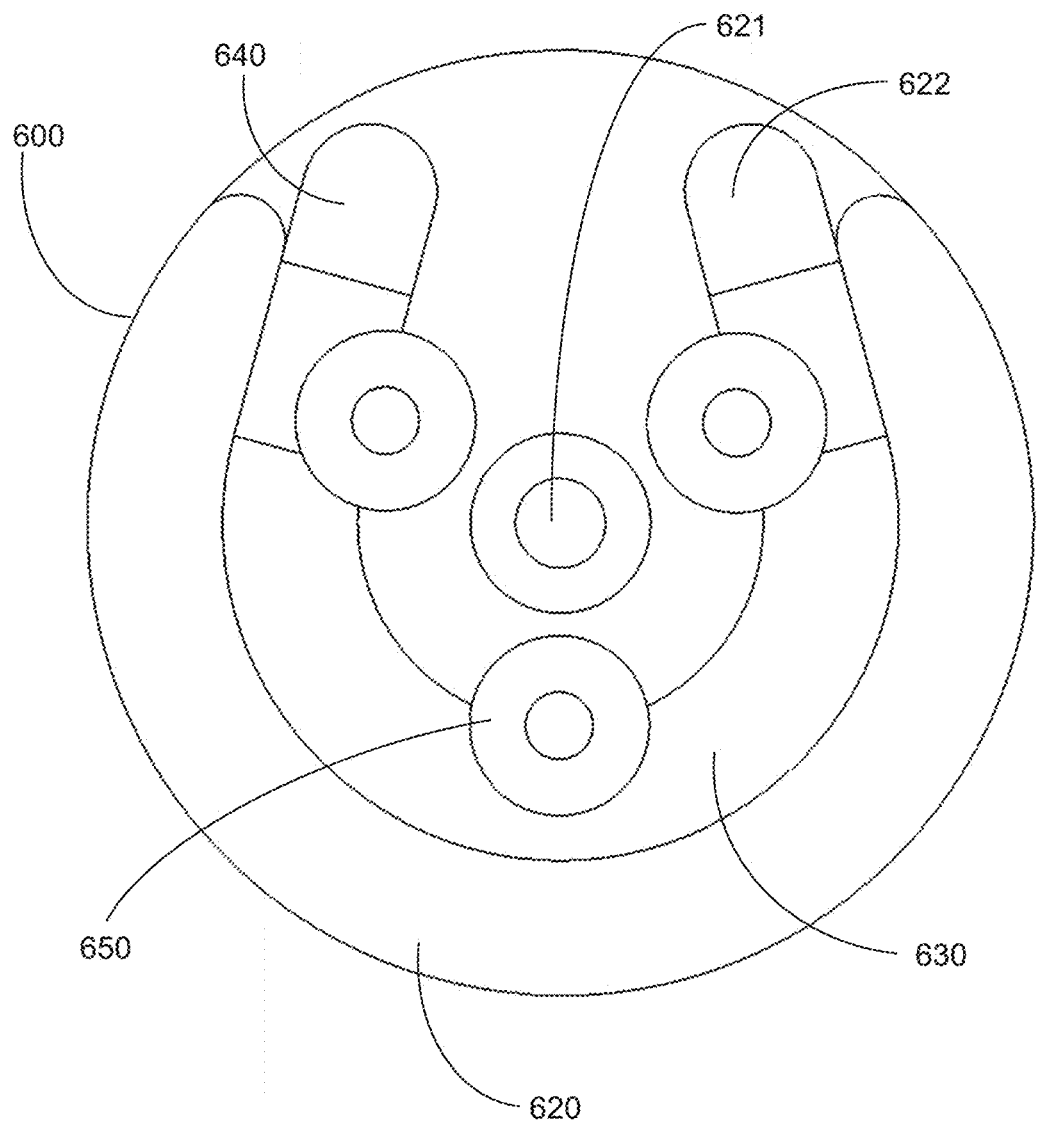
FIG. 6M is a bottom cross-section view of a pump head, according to an embodiment.

FIG. 6M is a bottom cross-section view of a pump head 600, according to an embodiment. In the example depiction, the capsule end cap 230, the pump head 600, including a pump body 620, a flexible barrier 630, disposed between the pump body 620 and the sink 610 and forming an arc centered around the pump body's inlet channel 621, and a plurality of wheels 650, disposed in contact with the flexible barrier 630, are visible. In the exemplary embodiment, liquid from the capsule body 133 flows through the sink's central channel 611 into the pump body 620.

Figure 6N:
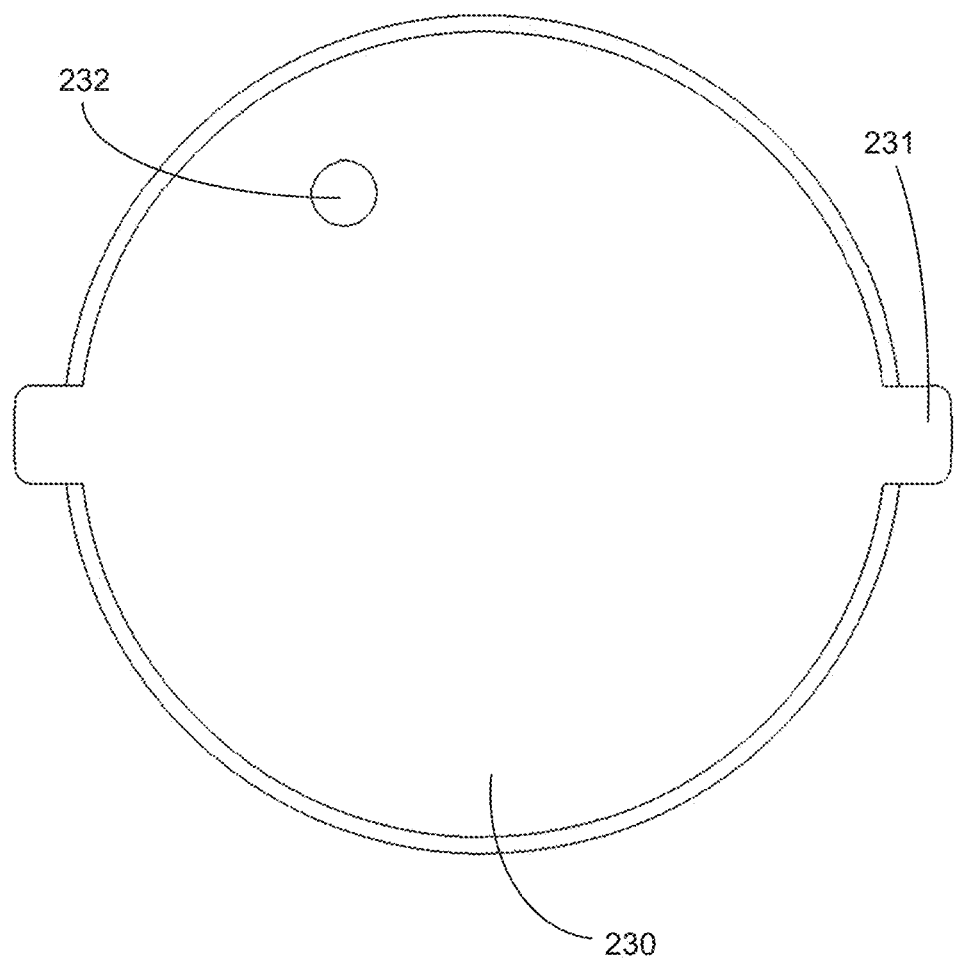
FIG. 6N is a bottom view of a pump head according to an embodiment.

FIG. 6N is a bottom view of a pump head 600, according to an embodiment. In the example depiction, the capsule end cap 230, including the end cap aperture 232 and the orientation tabs 231, is visible. In the exemplary embodiment, liquid flows from the capsule 130, through the pump head 600, and through the capsule end cap aperture 232, where it is dispensed.

Figure 7:
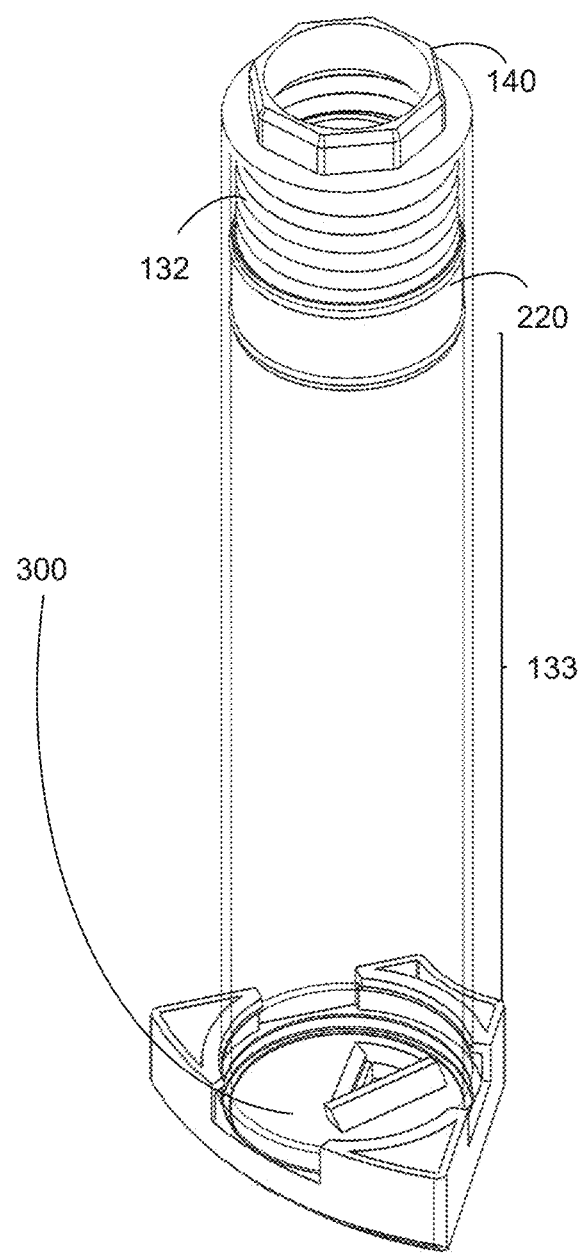
FIG. 7 is a right-isometric view of a single capsule according to an embodiment.

FIG. 7 is a right-isometric view of a single capsule 130, according to an embodiment. In the example embodiment, the capsule 130 includes a capsule body 133, a pusher 220, a pushing element 132, a locking hub 140, an end cap 230, disposed at one end of the capsule opposite the locking hub 140, and a dispensing element 300, disposed within the end cap 230 and in contact with the material contained in the capsule 130. In an embodiment, the end cap 230 may have a non-circular shape, allowing orientation by the same techniques applied to the orientation tabs discussed, and allowing manufacturers to design proprietary capsules for specific material blends.

Figure 8:
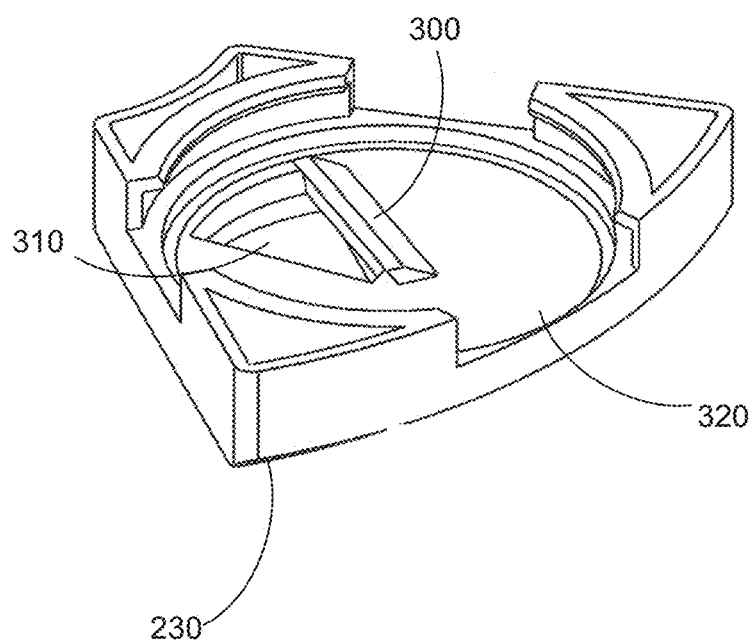
FIG. 8 is a left-isometric view of a capsule end cap according to an embodiment.

FIG. 8 is a left-isometric view of a capsule end cap 230, according to an embodiment. In the example embodiment, an end cap 230 is depicted with a dispensing element 300, within the end cap 230 and having first and second faces, an aperture 310 through the body of the dispensing element 300, and a scraping blade 320 disposed adjacent to the aperture 310 and in contact with the material in the capsule 130. In an embodiment, the end cap 230 may have a non-circular shape, allowing orientation by the same techniques applied to the orientation tabs depicted, and allowing manufacturers to design proprietary capsules for specific material blends.

Figure 9:
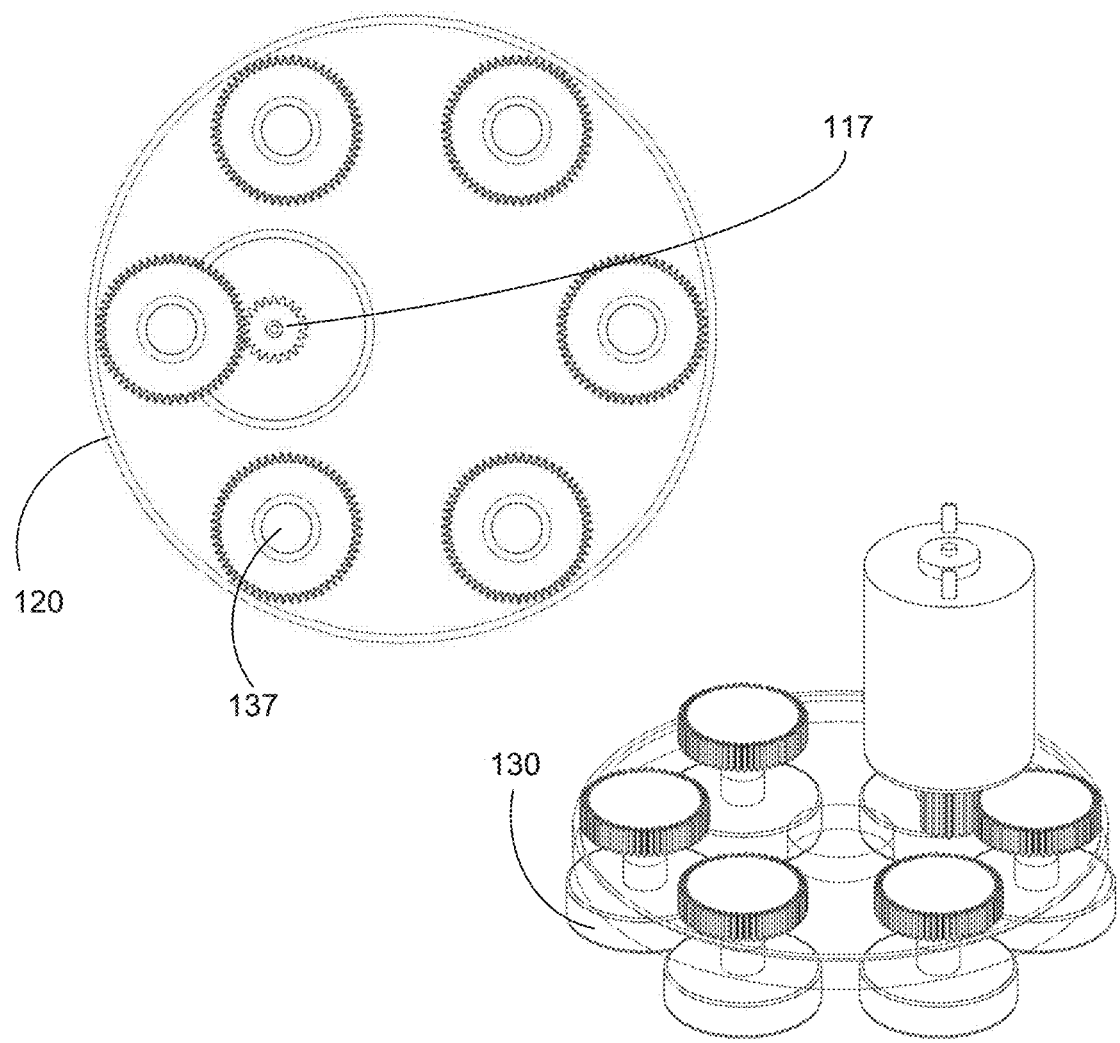
FIG. 9 is a schematic diagram illustrating the operation of a capsule-changing mechanism, according to an embodiment.

FIG. 9 is a schematic diagram illustrating the operation of a capsule-changing mechanism, according to an embodiment. In the example depiction, a plurality of capsules 130, a motor 116, and a gear 117, are visible. In the example embodiment, activation of the motor 116 causes the motor 116 to turn a connecting element. In the example embodiment, the rotation of the connecting element causes the attached gear 117 to spin. In the example embodiment, the rotation of the gear 117, disposed in contact with a toothed gear element 137 of the capsule 130, causes the capsule 130 to rotate. In the example embodiment, the rotation of the capsule 130, where a material and a dispensing element 300 are included in the capsule 130, allows the dispensing element 300 to activate, dispensing the material contained within the capsule at a constant rate per unit of motor activity.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A dispensing device for dispensing material, comprising:
   a dispensing head;
   a capsule magazine, including at least one void;
   at least one material capsule, having a tubular shape, a distal end and a proximal end, wherein the at least one material capsule is disposed within the at least one void in the capsule magazine;
   a motor, operable to provide mechanical power for material dispensing operations, wherein the motor is disposed within the dispensing head; and
   a gear mechanically connected to the motor, wherein the gear is further disposed momentarily in connection with the at least one material capsule such that operation of the motor causes rotation of the gear and, in turn, rotation of the at least one material capsule;
   wherein said at least one material capsule comprises:
     a. distal end cap located at said distal end of said at least one material capsule and comprising a dispensing element comprising a first face and a second face; said first face facing material located inside of said at least one material capsule; said dispensing element comprises an extending scraping blade located on said first face;
     b. a pusher, configured to compact said material into a single bulk material;
   wherein said rotation of said at least one material capsule causes a rotation of said single bulk material against said extending scraping blade to knock loose a calibrated unit of said single bulk material.

2. The device of claim 1, further comprising:
   a trigger connected electrically to the motor such that operation of the trigger activates the motor.

3. The device of claim 1, further comprising:
   a display to provide a user interface.

4. The device of claim 3, further comprising:
   an electronic circuit disposed in the dispensing head, wherein the electronic circuit is configured to perform at least one of:
   controlling operation of the motor; and
   rendering and causing a display of the user interface.

5. The device of claim 4, wherein the electronic circuit is further configured to perform:
   wirelessly connecting to an external user device, wherein the external user device is installed with an agent, and wherein the agent when executed by the external user device is configured to control the dispensing device and collect usage data related to the dispensed material.

6. The device of claim 1, further comprising:
   a locking mechanism disposed in a device head, wherein the locking mechanism contains at least one set of locking appendages, wherein the at least one set of locking appendages is structured to:
   secure a material capsule of the at least one material capsule, and release a material capsule of the at least one material capsule, wherein the locking mechanism is further adapted to secure the capsule magazine.

7. The device of claim 6, wherein the at least one material capsule is attached to the dispensing head via the locking mechanism.

8. The device of claim 1, further comprising:
   a dispensing element disposed within the hollow internal containing volume of the at least one material capsule, and wherein the dispensing element is operable to disperse material from the at least one material capsule upon rotation of the material capsule relative to the dispensing element.

9. The device of claim 8, wherein the end cap rotates independently of the dispensing element, and wherein the end cap is operable, with rotation, to provide an open, semi-open, or closed shut-off valve.

10. The device of claim 8, wherein the dispensing element further comprises:
    a pump head, wherein the pump head includes a sink, a pump body, a dispensing aperture, at least one pump wheel, and a flexible barrier.

11. The device of claim 10, wherein the rotation of the pump head and the flexible barrier in a first direction relative to the at least one pump wheel causes the at least one pump wheel to deform the flexible barrier, thereby creating at least one fluid-filled segment within any one of: the flexible barrier, and a volume between the flexible barrier and the pump body, and wherein a continued rotation of the pump head and the flexible barrier, relative to the at least one pump wheel, creates a pressure differential, causing fluid to move from one end of the flexible barrier to the other.

12. The device of claim 10, wherein the pump head and the at least one pump wheel may be rotated in a second direction opposite the first direction to cause a liquid in the flexible barrier to move into the at least one material capsule.

13. The device of claim 1, wherein the dispensing element is disposed at one end of the capsule.

14. The device of claim 8, wherein the dispensing element is a circular plate including an end cap, wherein the end cap includes an aperture, and wherein the circular plate includes an aperture.

15. The device of claim 1,
    wherein said pusher comprises at least one first major axis, wherein the pusher is disposed co-axially with the first major axis of the at least one material capsule and within the hollow internal containing volume of the same.

16. The device of claim 15, wherein the pusher is operable to move the circular plate along the first major axis of the material capsule.

17. The device of claim 1, wherein the material contained in the at least one material capsule includes any one of:
    liquids;
    powders; and
    seeds.

18. The device of claim 1, wherein control of the dispensing device is in response to at least one flavor profile.

19. A dispensing material system, comprising:
a dispensing device for dispensing material according to claim 1; and
an external user device installed with an agent, wherein the agent when executed by the external user device is configured to control the dispensing device and collect data related to the dispensed material.

20. The device of claim 1, wherein the magazine is detachable.

21. The device of claim 1, wherein the material includes spices.

22. The device of claim 1, wherein when there is a plurality of said at least one material capsule each of the plurality of material capsules stores a different type of material.

23. The device of claim 1, wherein said dispensing device is configured to dispense a calibrated unit of said material that is dispensed per each unit of motor activity.

24. A material capsule operable in a dispensing device for dispensing material, comprising:
a tubular shape, a distal end and a proximal end;
a distal end cap located at said distal end of said at least one material capsule and comprising a dispensing element comprising a first face and a second face; said first face facing material located inside of said at least one material capsule; said dispensing element comprises an extending scraping blade located on said first face;
a pusher configured to compact said material into a single bulk material;
wherein said rotation of said at least one material capsule causes a rotation of said single bulk material against said extending scraping blade to knock loose a calibrated unit of said single bulk material.

25. The material capsule of claim 24, wherein the at least one material capsule is disposed within a void in a at least one material capsule magazine.

26. The material capsule of claim 24, wherein the material capsule is marked for recognition by a dispensing device.

27. The material capsule of claim 24, further comprising:
a dispensing element disposed within the hollow internal containing volume of the capsule, and wherein the dispensing element is operable to disperse material from the capsule upon rotation of the material capsule relative to the dispensing element.

28. The material capsule of claim 24, wherein the dispensing element is a circular plate including an end cap, wherein the end cap includes an aperture, and wherein the circular plate includes an aperture.

29. The material capsule of claim 24, wherein the end cap rotates independently of the dispensing element, and wherein the end cap is operable, with rotation, to provide an open, semi-open, or closed shut-off valve.

30. A material capsule operable in a dispensing device for dispensing material, comprising:
a hollow barrier adapted to contain material to be dispensed, wherein the barrier is open at one end;
a dispensing element adapted to dispense the material contained in the barrier;
wherein the dispensing element further comprises:
a pump head, wherein the pump head includes a sink, a pump body, a dispensing aperture, at least one pump wheel, and a flexible barrier;
wherein rotation of said material capsule activates the mechanism of said pump head.

31. The material capsule of claim 30, wherein the rotation of the pump head and the flexible barrier in a first direction relative to the at least one pump wheel causes the at least one pump wheel to deform the flexible barrier, thereby creating at least one fluid-filled segment within at least one of: the flexible barrier, and a volume between the flexible barrier and the pump body, and wherein a continued rotation of the pump head and the at flexible barrier, relative to the at least one pump wheel, creates a pressure differential, causing fluid to move from one end of the flexible barrier to the other.

32. The material capsule of claim 30, wherein the pump head and the at least one pump wheel may be rotated in a second direction opposite the first direction to cause a liquid in the flexible barrier to move into the at least one material capsule.

* * * * *